(12) United States Patent
Wan et al.

(10) Patent No.: US 7,681,495 B2
(45) Date of Patent: Mar. 23, 2010

(54) FOOD PROCESSING DEVICE

(75) Inventors: Yiu Chung Wan, Tsuen Wan (HK);
Lance Logan Hood, Seattle, WA (US)

(73) Assignee: Kwog Kuen So, Hong Kong (HK)

( * ) Notice: Subject to any disclaimer, the term of this patent is extended or adjusted under 35 U.S.C. 154(b) by 474 days.

(21) Appl. No.: 11/462,145

(22) Filed: Aug. 3, 2006

(65) Prior Publication Data

US 2007/0180727 A1    Aug. 9, 2007

Related U.S. Application Data

(63) Continuation-in-part of application No. 11/305,351, filed on Dec. 19, 2005, now abandoned.

(51) Int. Cl.
*A23L 1/00* (2006.01)

(52) U.S. Cl. .................. 99/495; 99/511; 34/58

(58) Field of Classification Search ........... 99/511–513, 99/485, 495, 516; 34/8, 58; 210/360.1, 380.1; 494/11, 37, 46, 60–63, 84; 426/443, 478, 426/601; 366/234, 601
See application file for complete search history.

(56) References Cited

U.S. PATENT DOCUMENTS

| | | | |
|---|---|---|---|
| 3,885,321 A | 5/1975 | Fouoineteau | |
| 4,144,286 A | 3/1979 | Casper et al. | |
| 5,054,209 A | 10/1991 | Koff | |
| 5,490,453 A | 2/1996 | Mackay | |
| 5,562,025 A | 10/1996 | Bull et al. | |
| 5,865,109 A | 2/1999 | Bull | |
| 5,992,309 A | 11/1999 | Mulhauser et al. | |
| 6,018,883 A | 2/2000 | Mulhauser | |
| 6,473,988 B1 | 11/2002 | Mulhauser et al. | |
| 6,510,785 B1 | 1/2003 | Margolin | |
| 6,622,618 B1 * | 9/2003 | Glucksman et al. | 99/495 |
| 7,080,463 B1 * | 7/2006 | Johnson | 34/312 |
| 7,111,546 B2 * | 9/2006 | Siegel et al. | 99/495 |
| 2005/0204935 A1 | 9/2005 | Siegel | |

FOREIGN PATENT DOCUMENTS

FR    2 642 294    8/1990

\* cited by examiner

*Primary Examiner*—Timothy F. Simone
(74) *Attorney, Agent, or Firm*—Leydig, Voit & Mayer, Ltd.

(57) ABSTRACT

A food processing device has a housing with a lid, a rotatable attachment (e.g., a basket or beater) in the housing and a drive mechanism in the lid for rotating the attachment to process food in the housing. The drive mechanism has a manual actuator and a gear train for transmitting a driving force from the actuator to rotate the attachment. The actuator lies on an outer surface of the lid and is movable along the lid surface in opposite directions between two positions to rotate the attachment in a single direction. A ratchet assembly in driving engagement with the gear train transmits a rotational drive in only a single direction. A braking mechanism for braking the attachment, includes a manual operator and two braking shoes for movement by the operator to brake the attachment by friction.

46 Claims, 26 Drawing Sheets

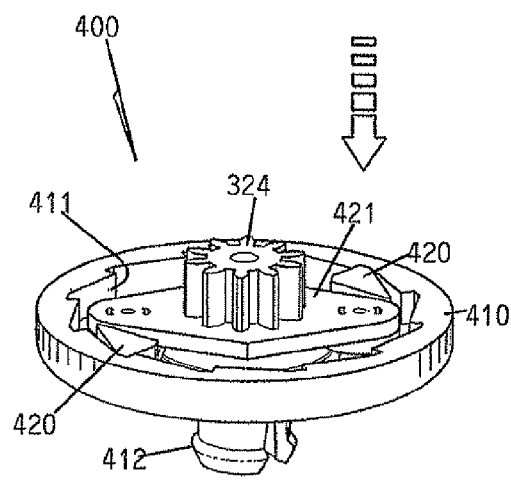
FIG. 11B
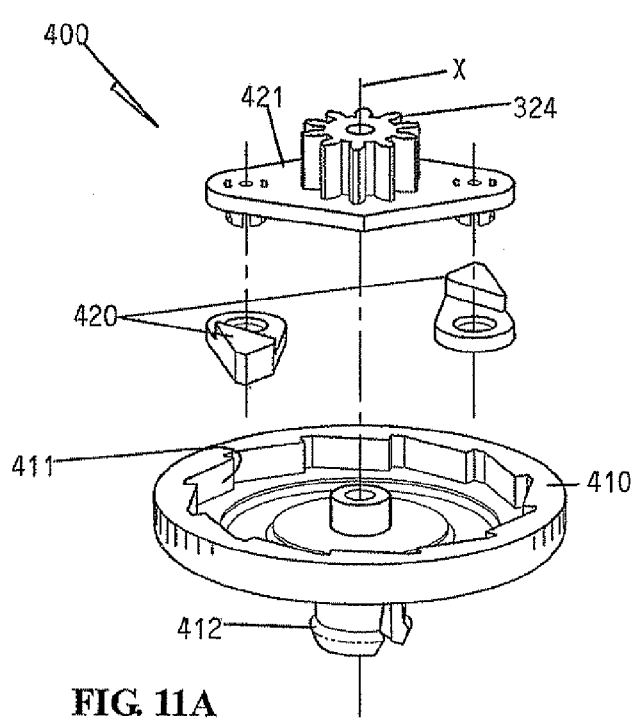
FIG. 11A
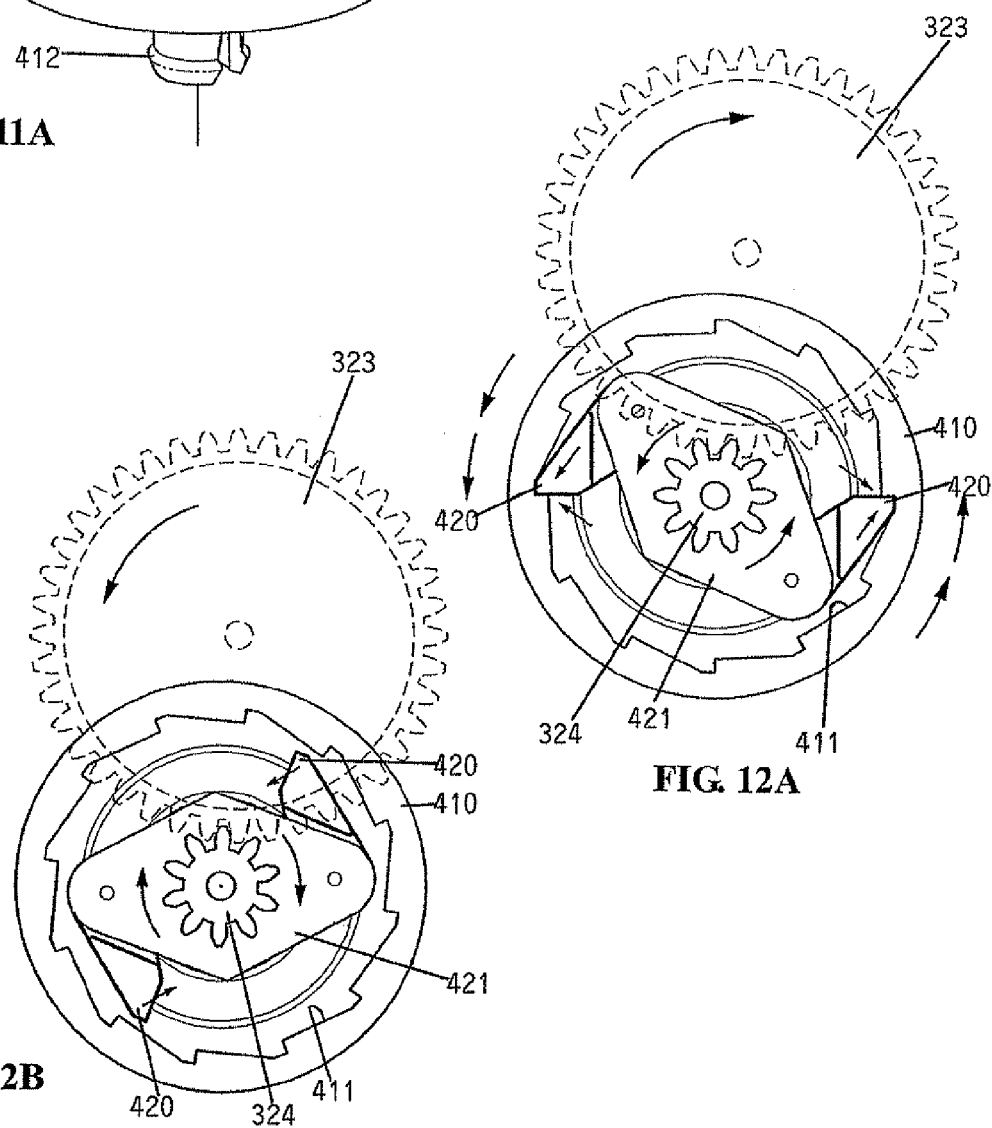
FIG. 12A
FIG. 12B

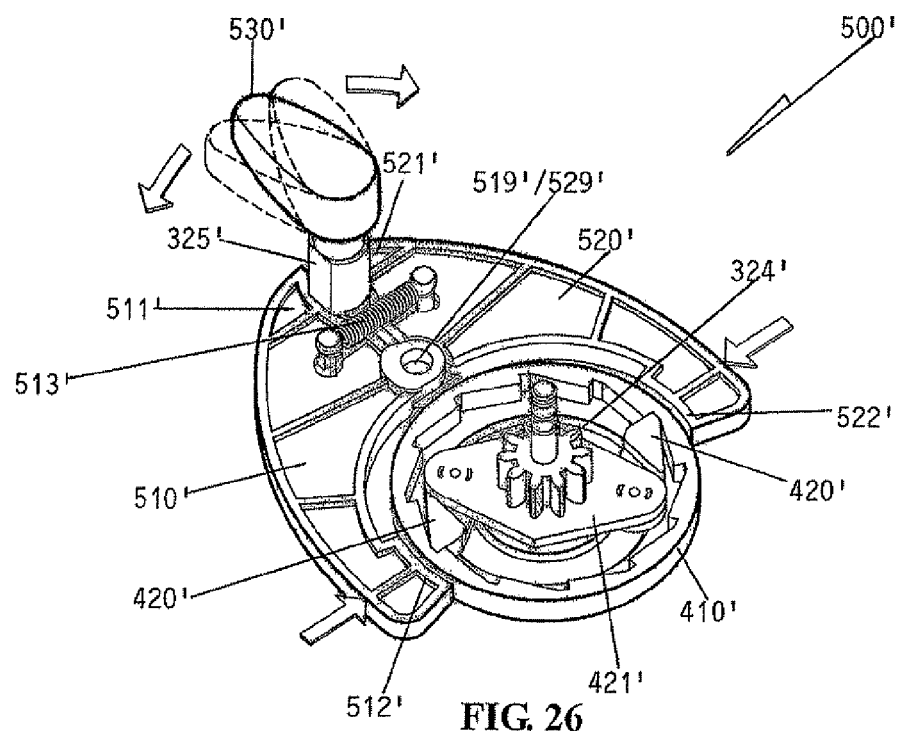
FIG. 26
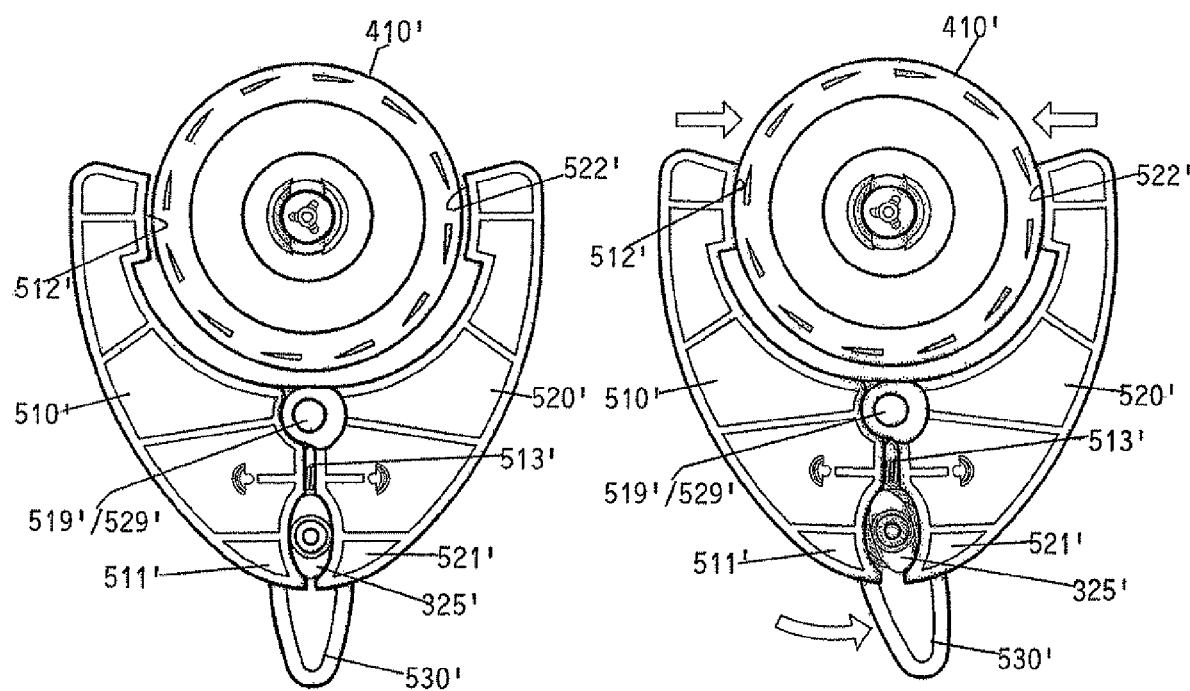
FIG. 26A
FIG. 26B

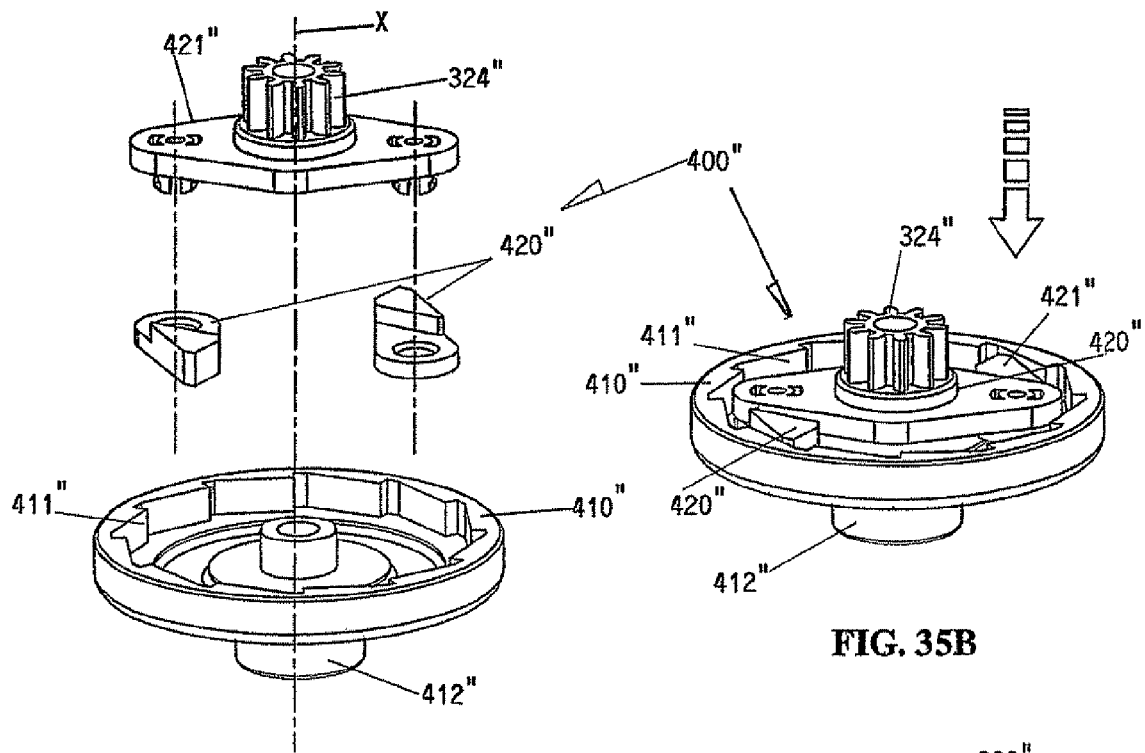
FIG. 35A
FIG. 35B
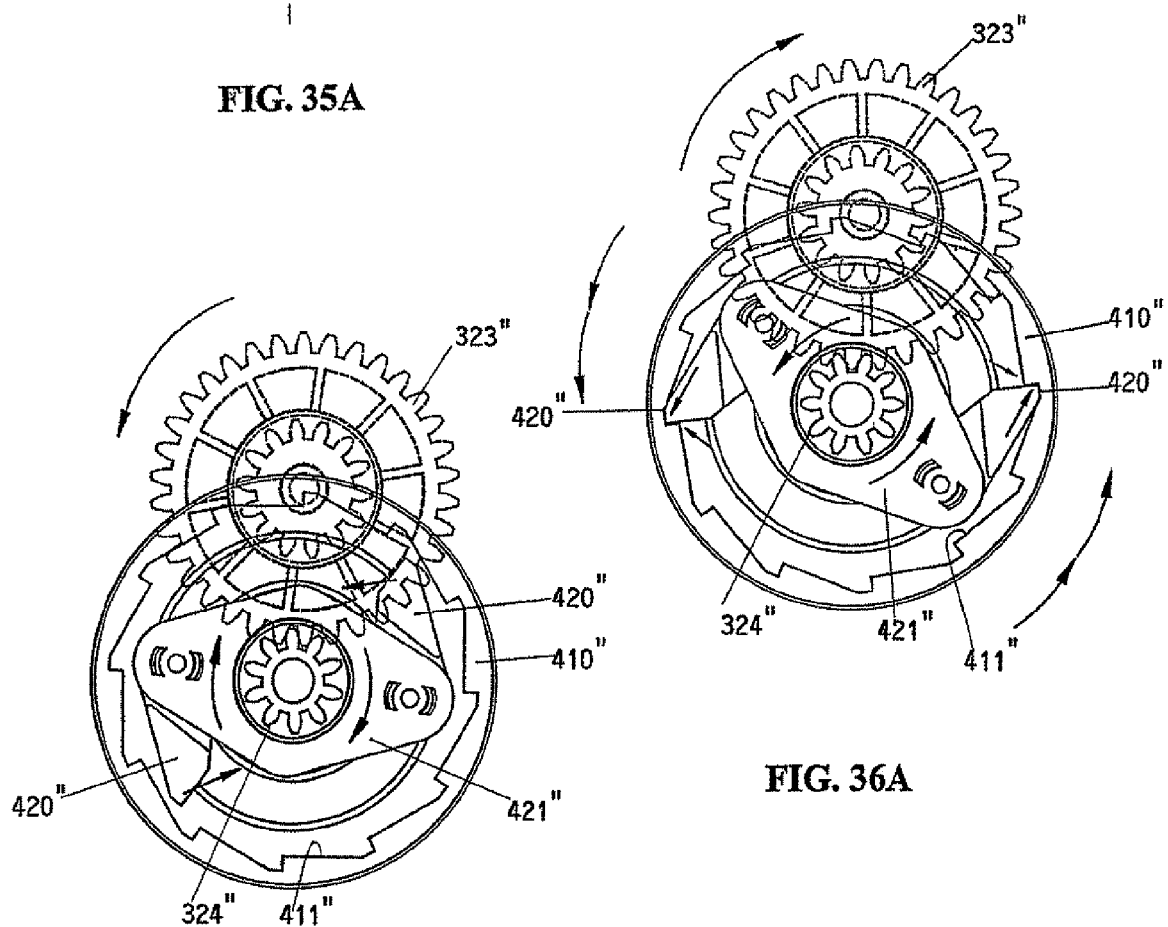
FIG. 36A
FIG. 36B

FOOD PROCESSING DEVICE

The present invention relates to a manually operated food processing device which operates with a rotary action.

BACKGROUND OF INVENTION

Food processing devices of the type concerned, such as food spinners and mixers, are commonly used in kitchens for processing food such as drying food (salad or vegetable) or mixing dressing or sauce therefor. Such processing devices are hand operated utensils. In a typical construction, they include a housing having a lid, an operating attachment such as a basket or beater supported in the housing for rotation, and a drive mechanism for rotating the attachment to process food. The drive mechanism usually incorporates a handle on a crank for turning by a user.

Such food processing devices often require the use of both hands by a user. Although rotation of the basket or beater can be speeded up by adopting a gear train of a higher gear ratio, turning of the handle can be stiff.

The invention seeks to obviate or at least alleviate at least such problems or shortcoming by providing a new or otherwise manual food processing device.

SUMMARY OF THE INVENTION

According to a first aspect of the invention, there is provided a food processing device comprising a housing having a lid, an operating attachment supported in the housing for rotation about an axis of rotation, and a drive mechanism supported by the lid for rotating the attachment to process food in the housing. The drive mechanism comprises a manually operable actuator and a drive transmission system provided between the actuator and the attachment to transmit drive from the actuator to rotate the attachment. The actuator lies on an outer surface of the lid and is movable along the lid surface in opposite directions between first and second positions to rotate the attachment in one single direction.

Preferably, the lid surface extends transversely of the axis of rotation.

More preferably, the lid surface extends at substantially right angles to the axis of rotation.

It is preferred that the actuator is resiliently biased towards the first position by a spring for self return to the first position upon release.

Advantageously, the lid includes an abutment for providing a support to a part of a user's hand while said hand operates the actuator, thereby facilitating one hand operation upon the actuator.

More advantageously, the abutment is raised from the lid surface.

More advantageously, the abutment is located within the periphery of the lid surface.

In a preferred arrangement, the actuator is supported for pivotal movement in opposite directions between the first and second positions.

More preferably, the actuator is elongate and is pivotable about one end thereof, the end being in drive engagement with the drive transmission system.

In another preferred arrangement, the actuator is supported for linear movement in opposite directions between the first and second positions.

More preferably, the actuator includes a rack in drive engagement with the drive transmission system.

In a specific construction, the drive transmission system comprises a train of gears.

Preferably, the attachment comprises a basket having a lid engageable by the drive mechanism for rotation thereby to spin off water from food in the basket.

Preferably, the attachment comprises an agitator engageable by the drive mechanism for rotation thereby to agitate food in the housing.

In a preferred embodiment, the drive mechanism includes a ratchet assembly in drive engagement with the drive transmission system to enable transmission of rotational drive only in said one single direction from the actuator to the attachment upon movement of the actuator from the first to the second position.

More preferably, the ratchet assembly is provided between the drive transmission system and the attachment.

More preferably, the ratchet assembly comprises a ratchet member and at least one pawl co-operable therewith, which are associated with the attachment and a trailing end member of the drive transmission system respectively.

Further more preferably, the ratchet member has a circular arrangement of skew teeth surrounding said at least one pawl for engagement thereby to transmit drive.

Yet further more preferably, said at least one pawl is hinged for free pivotal movement.

It is further preferred that the ratchet assembly includes at least two said pawls arranged symmetrically about an axis of rotation of the ratchet member.

It is yet further preferred that the ratchet assembly includes a carrier having opposite parts at each of which one said pawl is hinged.

It is still yet further preferred that the trailing end member of the drive transmission system includes the carrier.

Preferably, the attachment comprises a basket having a lid engageable by the ratchet assembly for rotation thereby to spin off water from food in the basket.

Preferably, the attachment comprises an agitator engageable by the ratchet assembly for rotation thereby to agitate food in the housing.

In a preferred embodiment, the food processing device includes a braking mechanism for braking the attachment, which comprises a manual operator and at least one braking member for movement by the operator to brake the attachment.

More preferably, the braking mechanism is housed inside the lid, with the operator exposed on the lid.

More preferably, the operator lies on an outer surface of the lid and is movable along the lid surface.

More preferably, said at least one braking member is resiliently biased by a spring into an inoperative position and is movable by the operator against the action of the spring to an operative position to brake the attachment.

More preferably, the drive mechanism includes a drive member for coupling with the attachment to rotate the attachment, with which drive member said at least one braking member is engageable to brake the attachment.

Further more preferably, the drive mechanism includes a ratchet assembly in drive engagement with the drive transmission system to enable transmission of rotational drive only in said one single direction from the actuator to the attachment upon movement of the actuator from the first to the second position, the ratchet assembly including the drive member.

Yet further more preferably, the ratchet assembly comprises a ratchet member and at least one pawl co-operable therewith, which are associated with the attachment and a trailing end member of the drive transmission system respectively, the ratchet member being the drive member.

Yet further more preferably, the ratchet member has a circular periphery upon which said at least one braking member is engageable to brake the attachment.

Still yet further more preferably, the braking mechanism includes two said at least one braking members disposed on opposite sides of the ratchet member.

Preferably, the attachment comprises a basket having a lid engageable by the drive member for rotation thereby to spin off water from food in the basket.

Preferably, the attachment comprises an agitator engageable by the drive member for rotation thereby to agitate food in the housing.

According to a second aspect of the invention, there is provided a food processing device comprising a housing having a lid, an operating attachment supported in the housing for rotation about an axis of rotation, and a drive mechanism for rotating the attachment to process food in the housing. The drive mechanism comprises a manually operable actuator, a drive transmission system provided between the actuator and the attachment to transmit drive from the actuator to rotate the attachment, and a ratchet assembly in drive engagement with the drive transmission system to enable transmission of rotational drive only in one single direction from the actuator to the attachment.

Preferably, the actuator is movable in opposite directions between first and second positions to rotate the attachment in said one single direction, and the ratchet assembly enables transmission of rotational drive only in said one single direction upon movement of the actuator from the first to the second position.

More preferably, the ratchet assembly is provided between the drive transmission system and the attachment.

More preferably, the ratchet assembly comprises a ratchet member and at least one pawl co-operable therewith, which are associated with the attachment and a trailing end member of the drive transmission system respectively.

Further more preferably, the ratchet member has a circular arrangement of slew teeth surrounding said at least one pawl for engagement thereby to transmit drive.

Yet further more preferably, said at least one pawl is hinged for free pivotal movement.

Yet further more preferably, the ratchet assembly includes at least two said pawls arranged symmetrically about an axis of rotation of the ratchet member.

Yet further more preferably, the ratchet assembly includes a carrier having opposite parts at each of which one said pawl is hinged.

Still yet further more preferably, the trailing end member of the drive transmission system includes the carrier.

Preferably, the attachment comprises a basket having a lid engageable by the ratchet assembly for rotation thereby to spin off water from food in the basket.

Preferably, the attachment comprises an agitator engageable by the ratchet assembly for rotation thereby to agitate food in the housing.

According to a third aspect of the invention, there is provided a food processing device comprising a housing having a lid, an operating attachment supported in the housing for rotation about an axis of rotation, and a drive mechanism for rotating the attachment to process food in the housing. The drive mechanism comprises a manually operable actuator, a drive transmission system provided between the actuator and the attachment to transmit drive from the actuator to rotate the attachment, and a braking mechanism for braking the attachment. The braking mechanism comprises a manual operator and at least one braking member for movement by the operator to brake the attachment by friction.

Preferably, the braking mechanism is housed inside the lid, with the operator exposed on the lid.

Preferably, the operator lies on an outer surface of the lid and is movable along the lid surface.

Preferably, said at least one braking member is resiliently biased by a spring into an inoperative position and is movable by the operator against the action of the spring to an operative position to brake the attachment.

Preferably, the drive mechanism includes a drive member for coupling with the attachment to rotate the attachment, with which drive member said at least one braking member is engageable to brake the attachment.

More preferably, the drive mechanism includes a ratchet assembly in drive engagement with the drive transmission system to enable transmission of rotational drive only in one single direction from the actuator to the attachment, the ratchet assembly including the drive member.

Further more preferably, the ratchet assembly comprises a ratchet member and at least one pawl co-operable therewith, which are associated with the attachment and a trailing end member of the drive transmission system respectively, the ratchet member being the drive member.

Yet further more preferably, the ratchet member has a circular periphery upon which said at least one braking member is engageable to brake the attachment.

Still yet further more preferably, the braking mechanism includes two said at least one braking members disposed on opposite sides of the ratchet member.

In a preferred embodiment, the actuator and the operator are implemented by separate devices.

In another preferred embodiment, the actuator and the operator are implemented by a unitary device movable in one direction to rotate the attachment and in the opposite direction to brake the attachment.

Preferably, the attachment comprises a basket having a lid engageable by the drive member for rotation thereby to spin off water from food in the basket.

Preferably, the attachment comprises an agitator engageable by the drive member for rotation thereby to agitate food in the housing.

BRIEF DESCRIPTION OF DRAWINGS

The invention will now be more particularly described, by way of example only, with reference to the accompanying drawings, in which:

FIGS. 11A and 11B are exploded and assembled top perspective views of a ratchet assembly of the salad spinner of FIG. 6;

FIGS. 12A and 12B are top plan views of the ratchet assembly of FIG. 11B, showing its operation in opposite directions;

FIG. 26 is a top perspective view of the braking mechanism of FIGS. 25A and 25B;

FIGS. 26A and 26B are top plan views of the braking mechanism of FIG. 26, showing how it operates;

FIGS. 35A and 35B are exploded and assembled top perspective views of a ratchet assembly of the dressing mixer of FIG. 27; and FIGS. 36A and 36B are top plan views of the ratchet assembly of FIG. 35B, showing its operation in opposite directions.

DETAILED DESCRIPTION OF PREFERRED EMBODIMENTS

Figure 1:
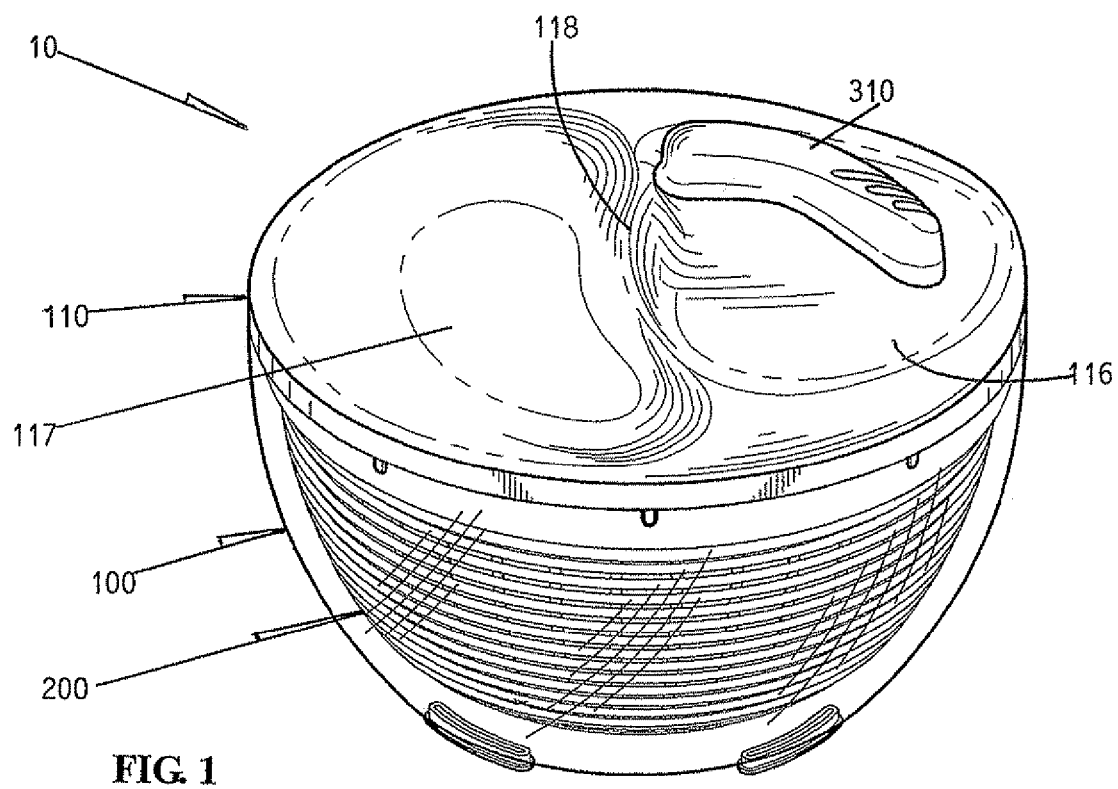
FIG. 1 is a top perspective view of a first embodiment of a food processing device, in the form of a salad spinner, in accordance with the invention.
Figure 2:
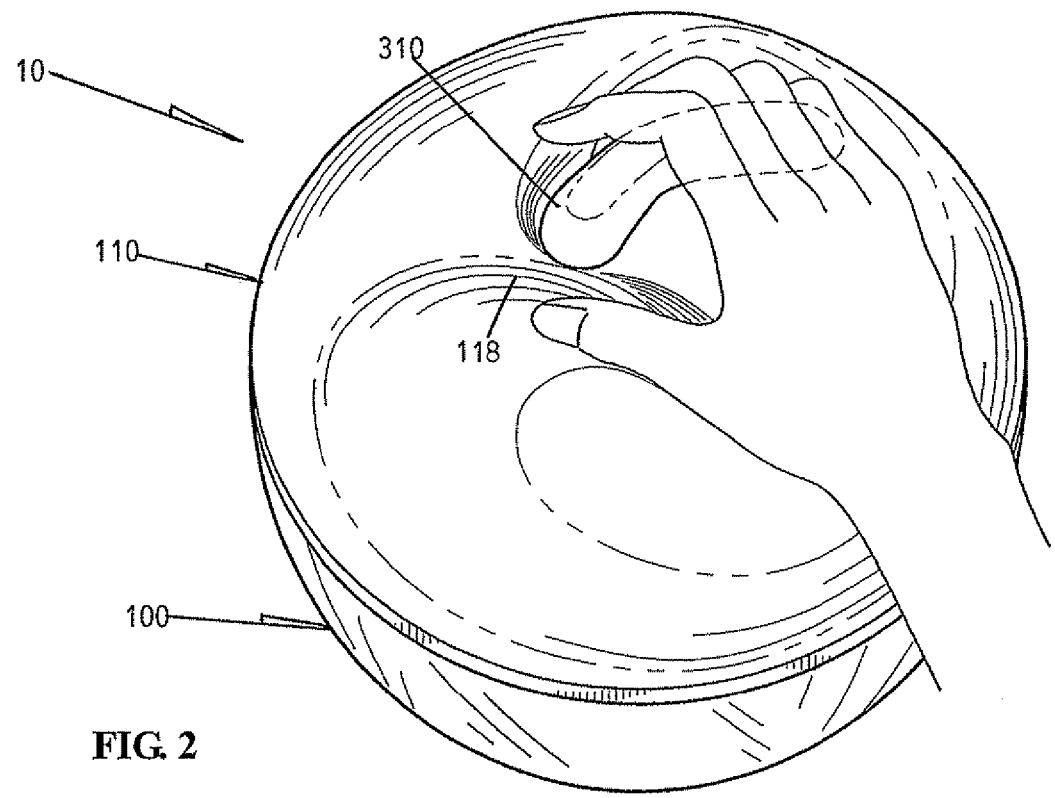
FIG. 2 is a top perspective view corresponding to FIG. 1, showing the salad spinner being operated by a hand.

Referring initially to FIGS. 1 to 15A of the drawings, there is shown a first food processing device in the form of a salad spinner 10 embodying the invention, which comprises a round bowl 100 as the housing having a circular top lid 110, a round basket 200 as the operating attachment contained in the bowl 100 and supported for rotation about a vertical central axis X, and a drive mechanism 300 supported by the lid 110 for rotating the basket 200 so as to spin off water from salad contained in the basket 200.

The basket 200 may be closed by its own circular lid 210, and it includes an array of longitudinally ribs 201 on its inner surface. The lid 210 has eight depending lugs 211 along its perimeter for laterally engaging upper ends of the basket ribs 201 (see FIGS. 5A and 5B) such that when the basket 200 is closed it can be rotated by the lid 210.

The basket 200 with lid 210 is slightly smaller than the interior of the bowl 100 with lid 110 to fit loosely therein. The bottom of the basket 200 has a dented centre for engaging upon an upwardly pointed centre of the bowl 100, thereby the basket 200 is centrally located at the bottom. The lid 210 has an upstanding cylindrical collar 212 at its centre, for coupling with the drive mechanism 300 for rotation thereby. A pair of holes 213 on opposite sides of the collar 212 facilitates holding of the lid 210 by a user.

The bowl lid 110 has a horizontal body 111 which is hollow and is open on its lower side and includes an integral short cylindrical collar 112 depending from a broad central region thereof. As part of the lid body 111, an inverted circular base cap 113 closes from below upon the collar 112 via a seal ring 114 to define an internal central cavity 115 of the lid 110, within which there are installed the drive mechanism 300 and a braking mechanism 500.

The drive mechanism 300 comprises a manually operable actuator in the form of a horizontal lever 310 and a gear train 320 provided between the lever 310 and the basket 200 via a ratchet assembly 400 as part of the mechanism 300. The gear train 320 acts as a speed increaser, having a gear ratio of about 10.3 to 1 (output to input). It is formed by a series of four gears 321 to 324 supported for rotation about vertical axes Y, X, Z and X respectively. The leading gear 321 has a square socket engaged by a depending square drive 311 at one end of the lever 310, about which the lever 310 is pivotable about axis Y in opposite directions by a user. The trailing gear 324 is integrated co-axially with a horizontal crossbar 421 of the ratchet assembly 400.

Figure 3:
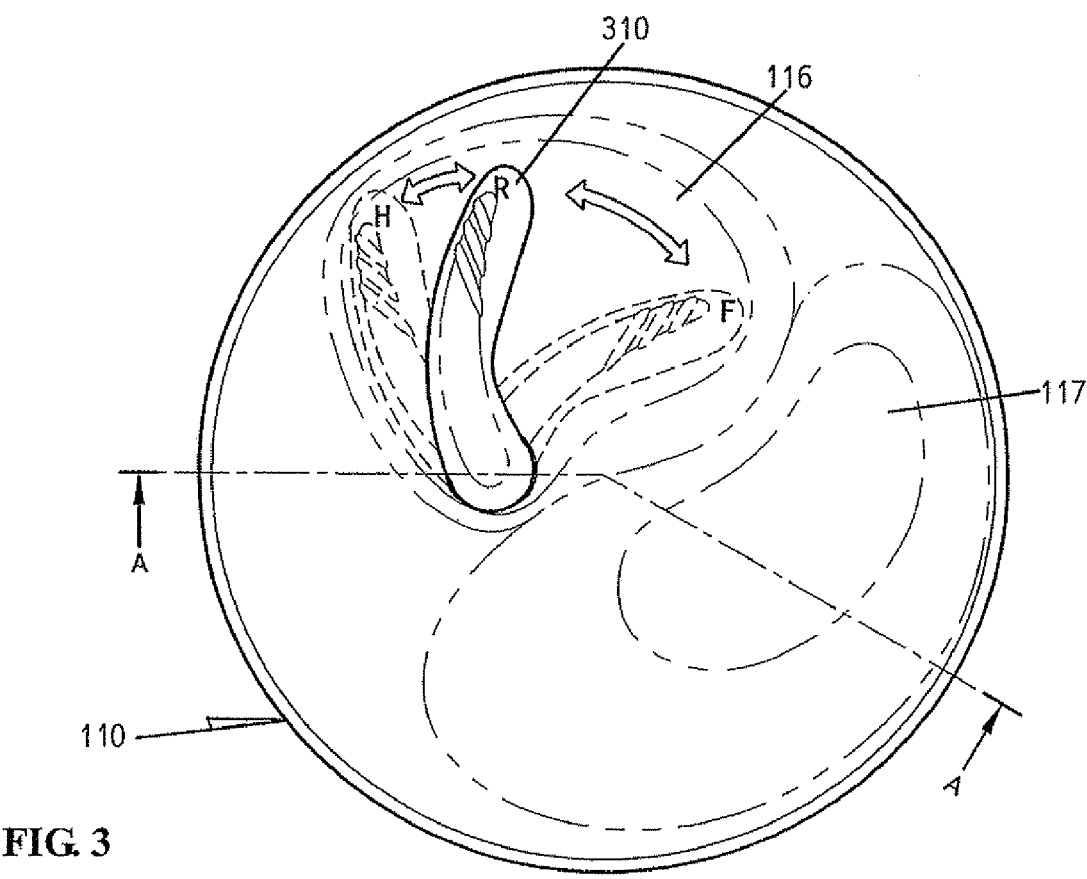
FIG. 3 is a top plan view of the salad spinner of FIG. 1.
Figure 4:
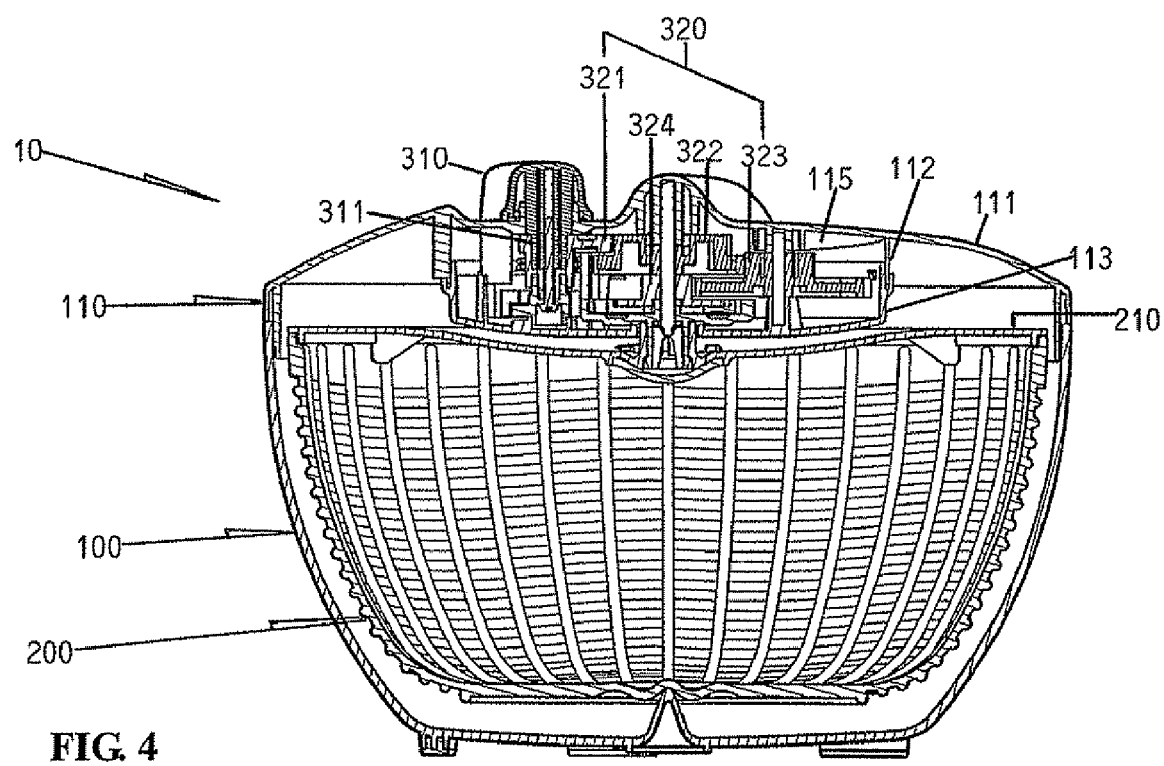
FIG. 4 is a cross-sectional side view of the salad spinner of FIG. 3, taken along line IV-IV.
Figure 5A:
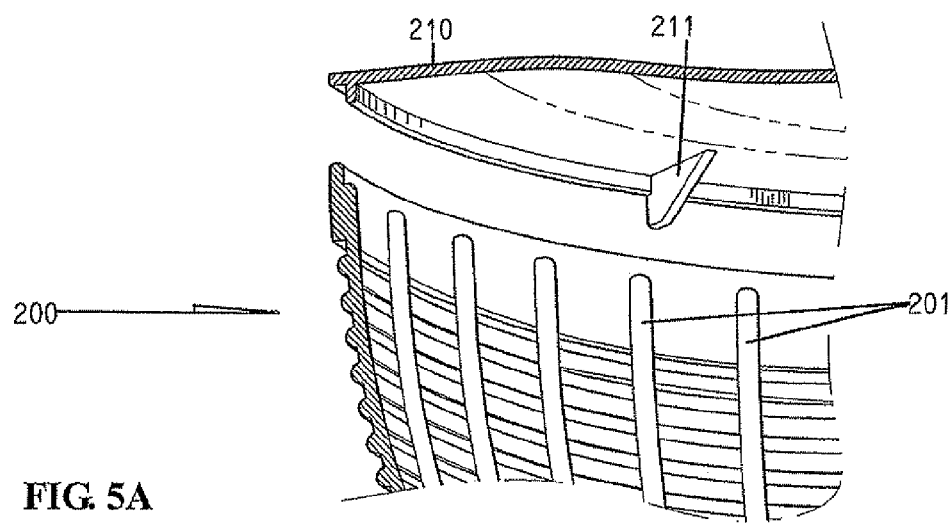
FIGS. 5A to 5C are fragmentary internal perspective views of part of the salad spinner of FIG. 1.
Figure 5B:
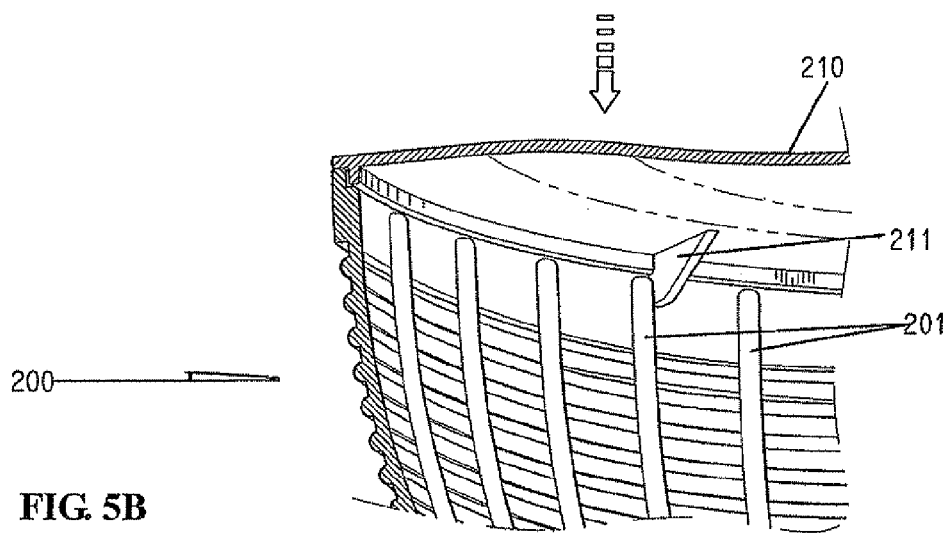
Figure 5C:
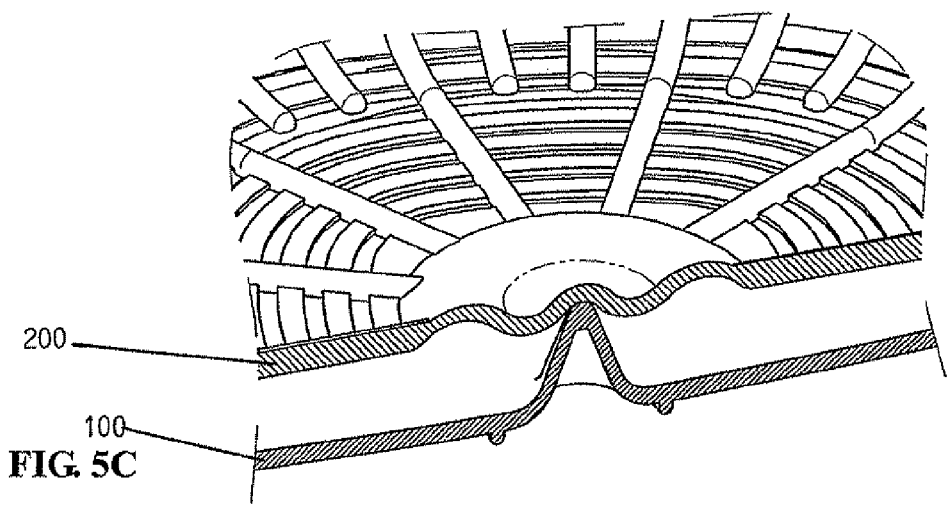
Figure 6:
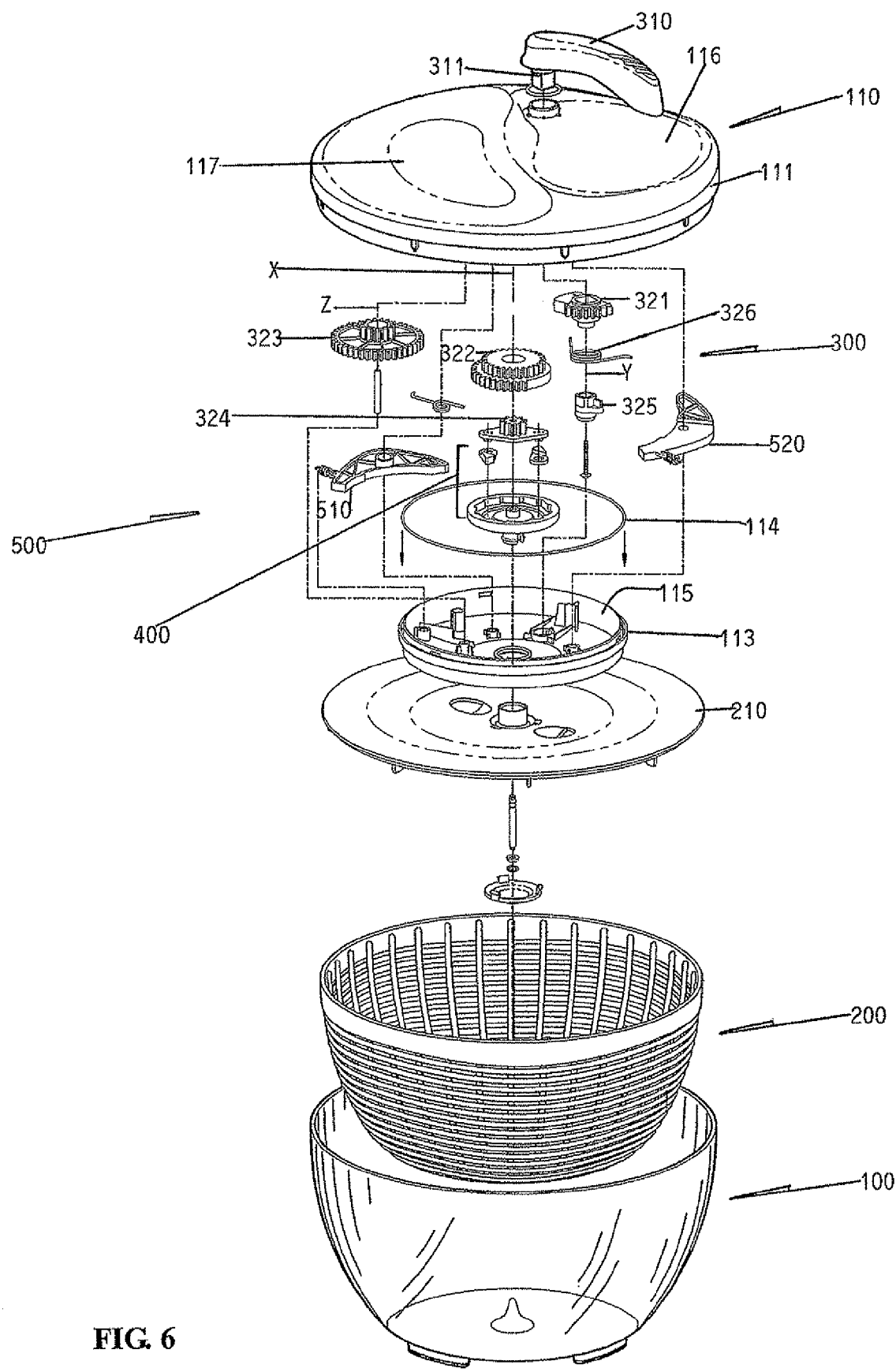
FIG. 6 is an exploded top perspective view of the salad spinner of FIG. 1.
Figure 7:
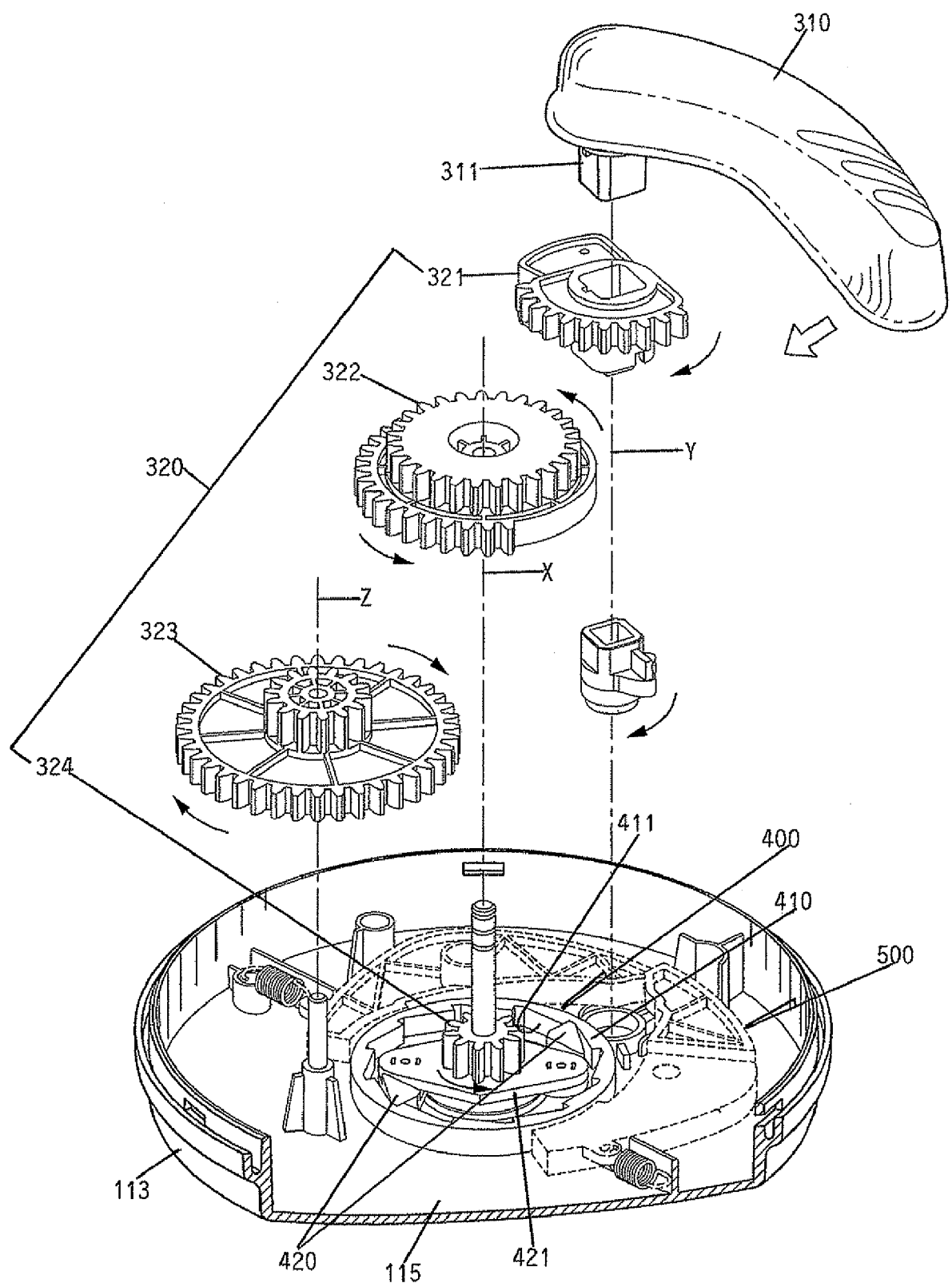
FIG. 7 is an exploded top perspective view of a drive mechanism of the salad spinner of FIG. 6.
Figure 8:
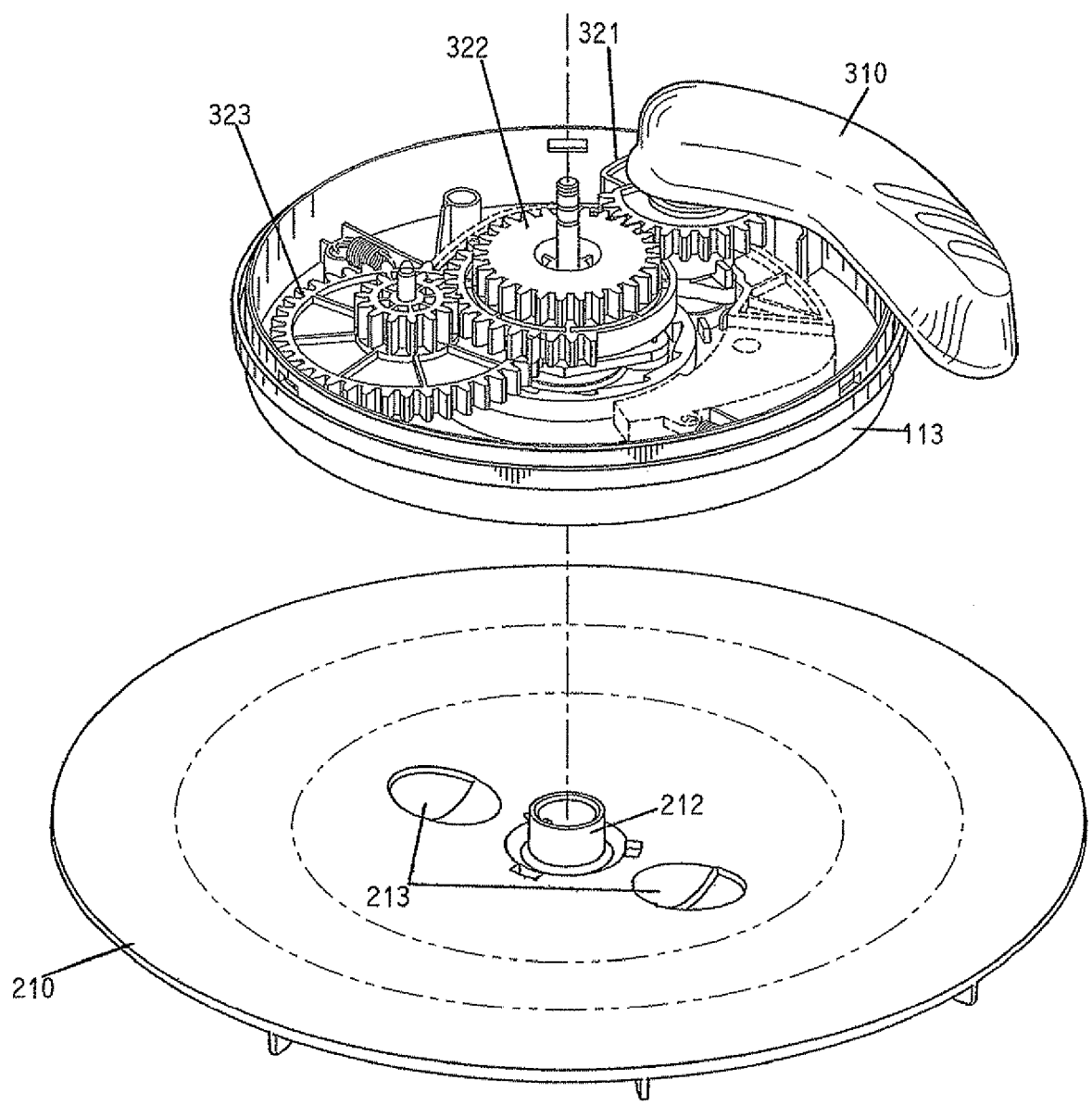
FIG. 8 is a top perspective view of the drive mechanism of FIG. 7.
Figure 9:
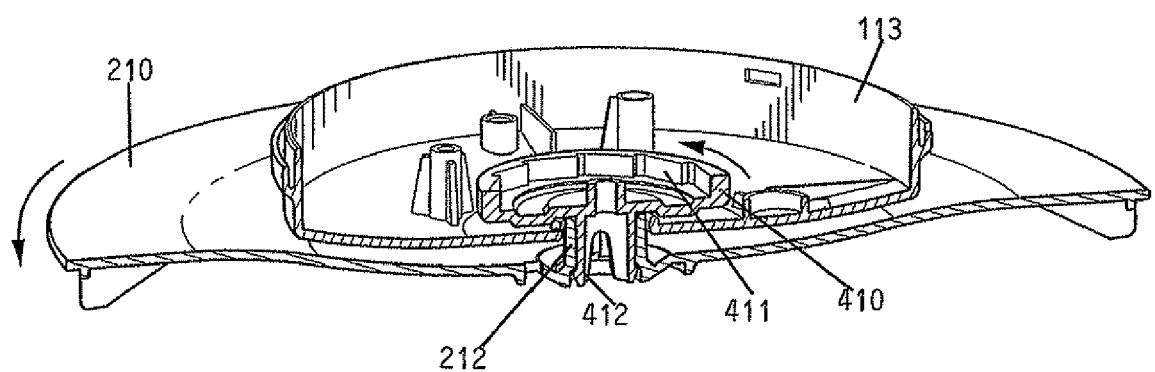
FIG. 9 is a fragmentary top perspective view of part of the drive mechanism of FIG. 8.

The leading gear 321 is co-axially coupled with a rotary cam 325 for simultaneous turning, together being resiliently biased by an elbow spring 326 to turn in the anti-clockwise direction. Suitable abutments are in place, for example as provided by parts of lid body 111 inside the cavity 115, to limit turning of the leading gear 321 to within an angle of approximately 90°, and hence pivoting of the lever 310 that is attached to the gear 321. In general, the arrangement is such that the lever 310 normally extends and stays in a specific rest angular position R (FIG. 3).

The upper, i.e., outer, surface of the body 111 of the bowl lid 110 is contoured to form two generally depressed level regions 116 and 117, which are separated by a ridge 118. The regions 116 and 117 extend transversely of, or at right angles to, the central axis X of rotation. The lever 310 lies on, or very close to, one region 116 in the rest position R, nearer one side of the region 116.

In operation, the lever 310 is pivoted by the right hand of a user (FIG. 2) in the clockwise direction through about 90° to the opposite side to a frontmost position F (FIG. 3) and, upon release, it will immediately self-return to the rest position R under the action of the spring 326. The opposite side of the ridge 118, facing the other flat region 117, provides an abutment support for the user's thumb to bear such that the user can conveniently find support to pull or squeeze the lever 310 close. One hand operation is facilitated by the design of the lever 310 and the lid 110. The ridge 118 is located within the periphery of the lid surface and, more specifically, somewhat in the middle of the lid surface as shown, such that the user's hand can rest entirely on the lid surface for stably holding the salad spinner 10 in position.

The ratchet assembly 400 is located centrally on the lid base cap 113. It is implemented by a horizontal circular rotary disc 410 having a recessed upper side, within which there is arranged a pair of pawls 420 hinged for free pivotal movement about respective vertical axes through opposite ends of the crossbar 421. The crossbar 421 and the pawls 420 carried thereby are arranged symmetrically about the central axis X for free rotation, and so is the disc 410. The disc 410 is formed with a circular arrangement of inclined or skew teeth 411 which extend around the inner side of disc periphery, surrounding the pawls 420 for ratchet engagement thereby in anti-clockwise direction as shown.

The ratchet disc 410 includes a central tubular socket 412 which extends downwardly through a center hole of the lid base cap 113. The socket 412 has its lower end notched on opposite sides to introduce a certain degree of resilience so that it can be snap-fitted into the collar 212 of the basket lid 210, whereby the lid 210 and hence the basket 200 is coupled with the disc 410 for rotation by the disc 410 acting as a drive member of the drive mechanism 300.

Figure 10A:
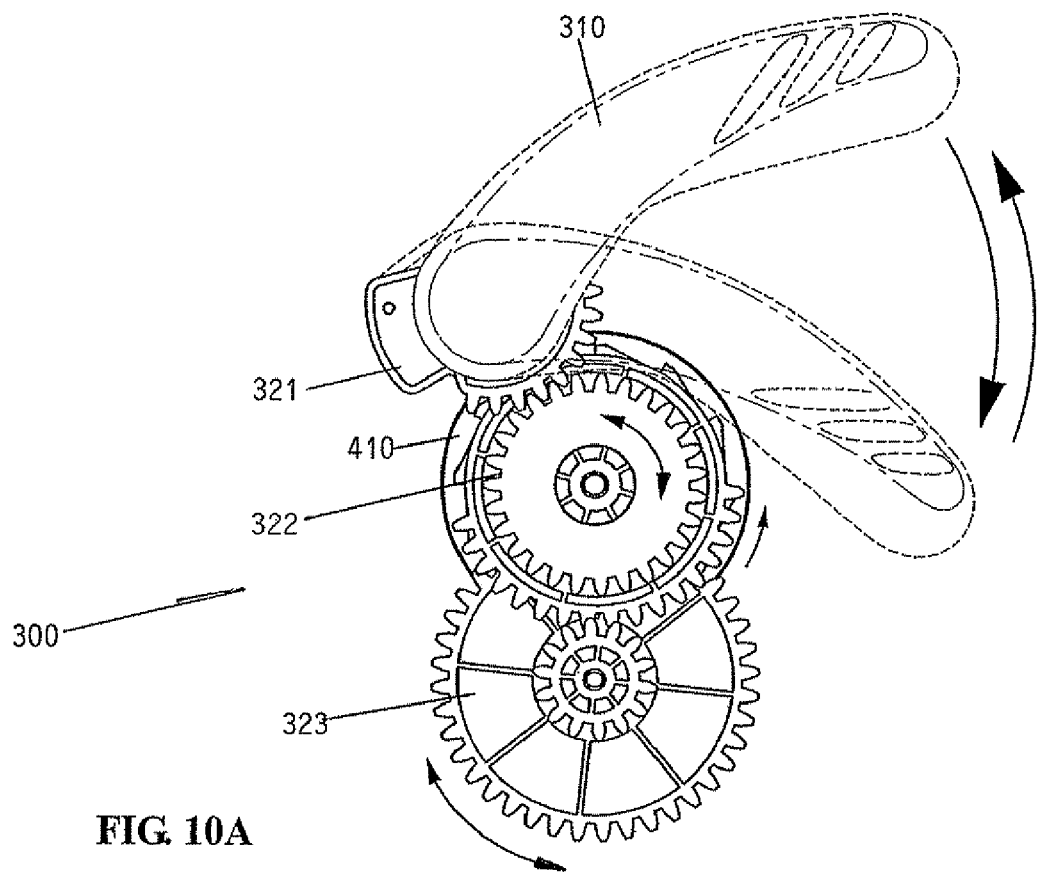
FIGS. 10A and 10B are top plan views showing the operation of the drive mechanism of FIG. 8.
Figure 10B:
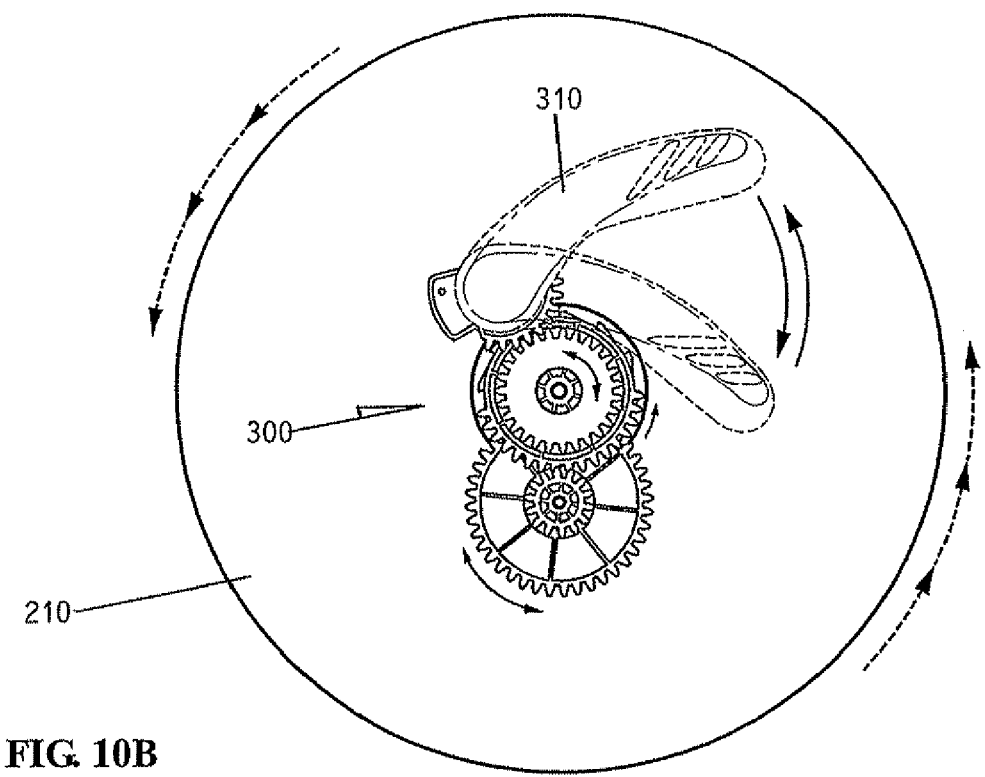
Figure 13:
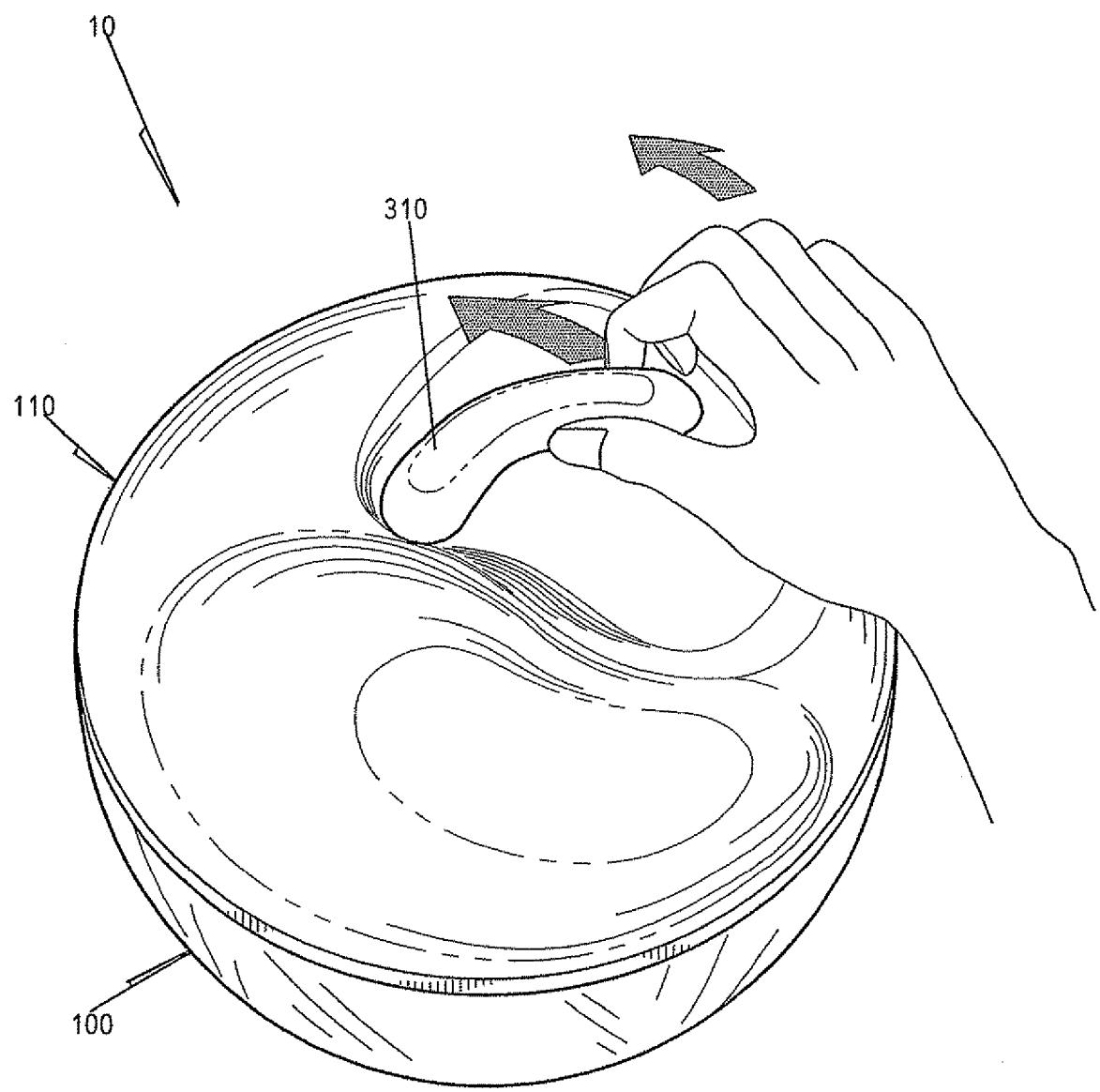
FIG. 13 is a top perspective view corresponding to FIG. 2, showing a hand operating a braking mechanism of the salad spinner.

In operation, the lever 310 is pulled and released as described above, and repeatedly to turn the gear train 320 in opposite directions (FIG. 10A). Such bi-directional rotational drive is speeded up and transmitted via the trailing gear 324 to the pawls 420 of the ratchet assembly 400. Through three transitions of gears, the pawls 420 turn in opposite direction compared to the lever 310.

As the lever 310 is pulled to pivot clockwise, the pawls 420 are turned anti-clockwise to thereby engage with or catch the ratchet teeth 411 and hence rotate the ratchet disc 410 anti-clockwise (FIG. 12A). Via the coupling between the ratchet disc 410 and the lid 210, the rotation is thus imparted to the basket 200, which then rotates in the same anti-clockwise direction of rotation.

As the lever 310 is subsequently released and pivots back anti-clockwise, the pawls 420 are turned clockwise and thus disengage from the teeth 411 and hence skip or release the ratchet disc 410, which is then permitted to continue to rotate anti-clockwise (FIG. 12B) with the basket 200 and lid 210 under the action of momentum. Continual rotation of the basket 200, etc. is practically unhindered.

By reason of such catch and release actions, the ratchet assembly 400 transmits drive from the gear train 320 to the basket 200 in one single direction of rotation (i.e., anti-clockwise) only upon pivoting of the lever 310 from its rest position R to its frontmost position F. Such transmission repeats for as long as the lever 310 is being swayed. Although the rotational drive is transmitted and applied to the basket 200 only intermittently, each time the drive is applied the basket 200 gains speed and accelerates, and the basket 200 rotates freely through successive drives. The basket 200 may reach a maximum speed of about 800 rpm after say five to six strokes if the lever 310 is pivoted rapidly and frequently enough.

To stop rotation of the basket 200 swiftly, the salad spinner 10 includes a braking mechanism 500 which comprises a pair of braking shoes 510 and 520 arranged for pivotal movement by the lever 310 via the rotary cam 325 when the lever 310 is pivoted or pushed anti-clockwise from its rest position R to a hindmost position H (FIG. 3). The shoes 510 and 520 are planar and crooked and are housed inside the cavity 115 of the bowl lid 110, on opposite left and right sides of and on the same plane as the ratchet disc 410.

Figure 14:
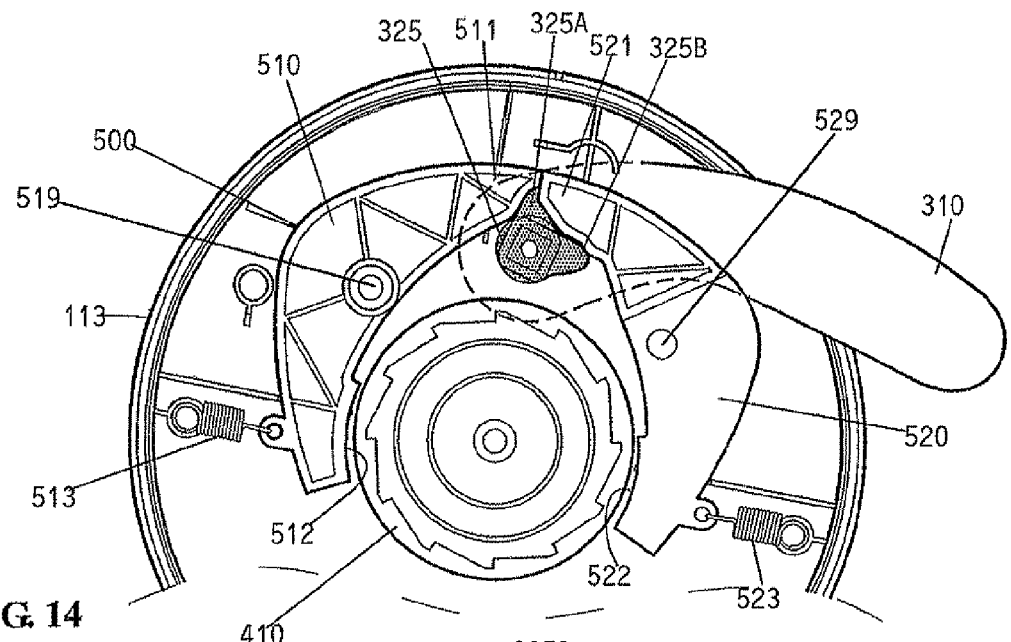
FIGS. 14 and 14A are fragmentary top plan views of the braking mechanism of FIG. 13.
Figure 15:
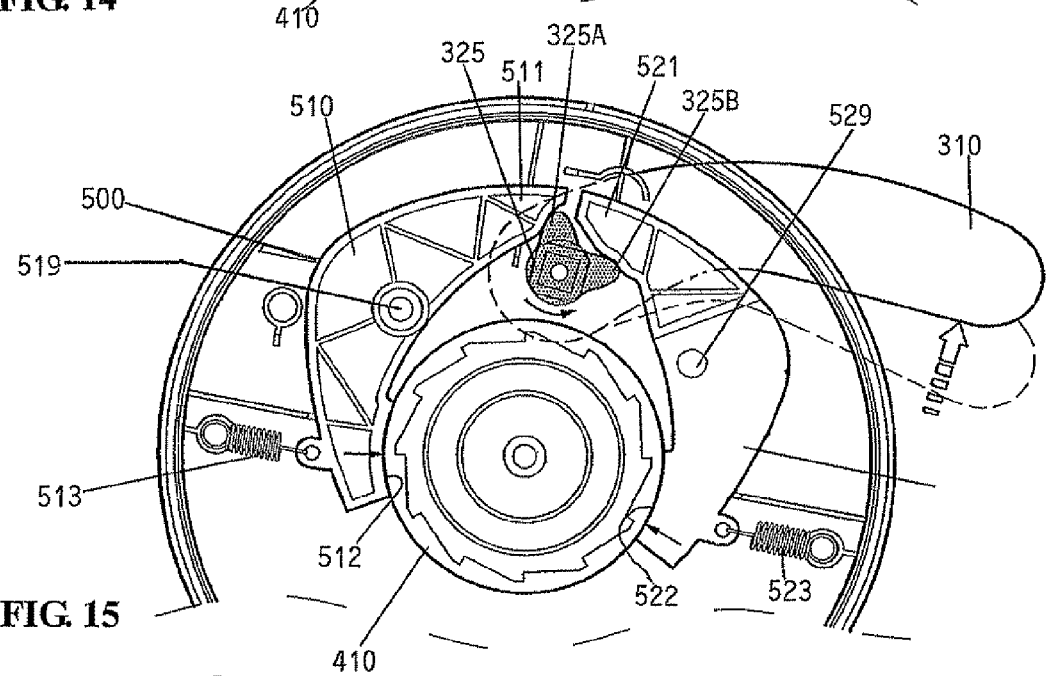
FIGS. 15 and 15A are fragmentary top plan views corresponding to FIGS. 14 and 14A, showing the braking mechanism in action.
Figure 14A:
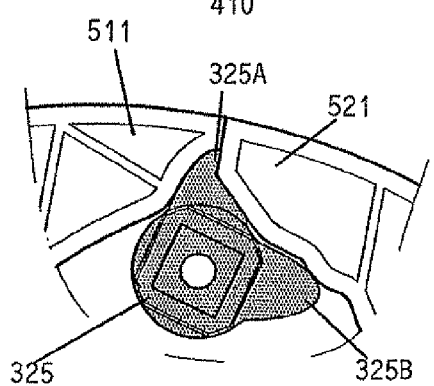
Figure 15A:
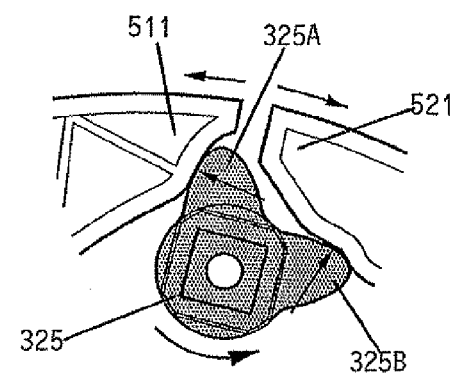
Figure 16:
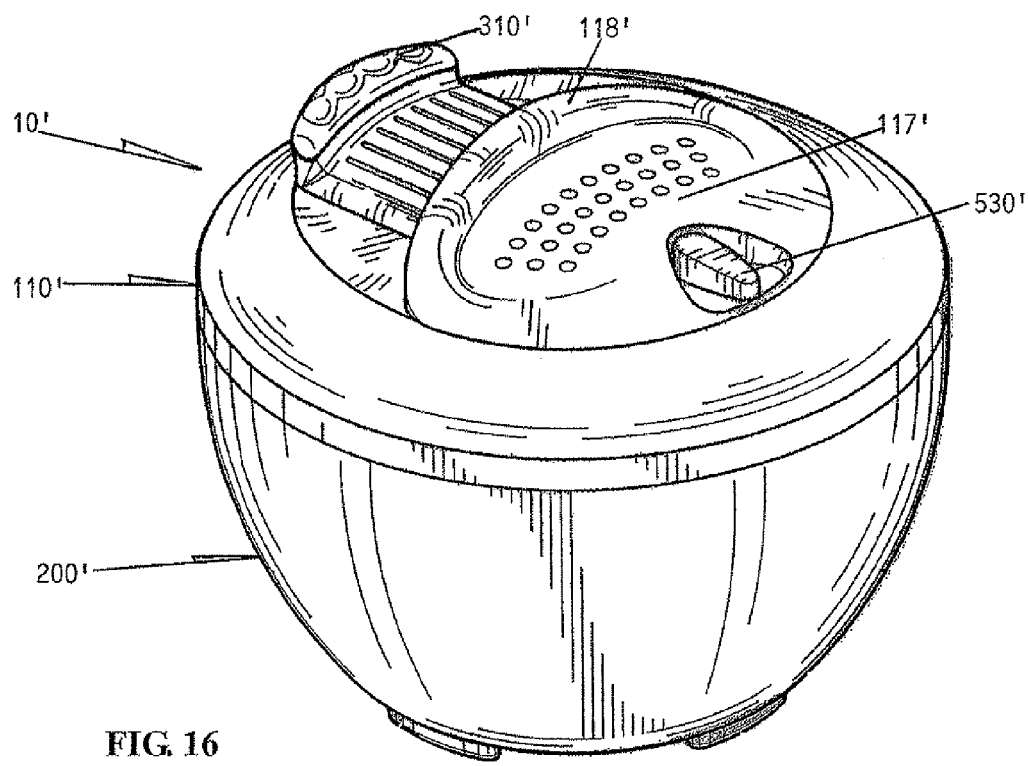
FIG. 16 is a top perspective view of a second embodiment of a food processing device, in the form of another salad spinner, in accordance with the invention.
Figure 17:
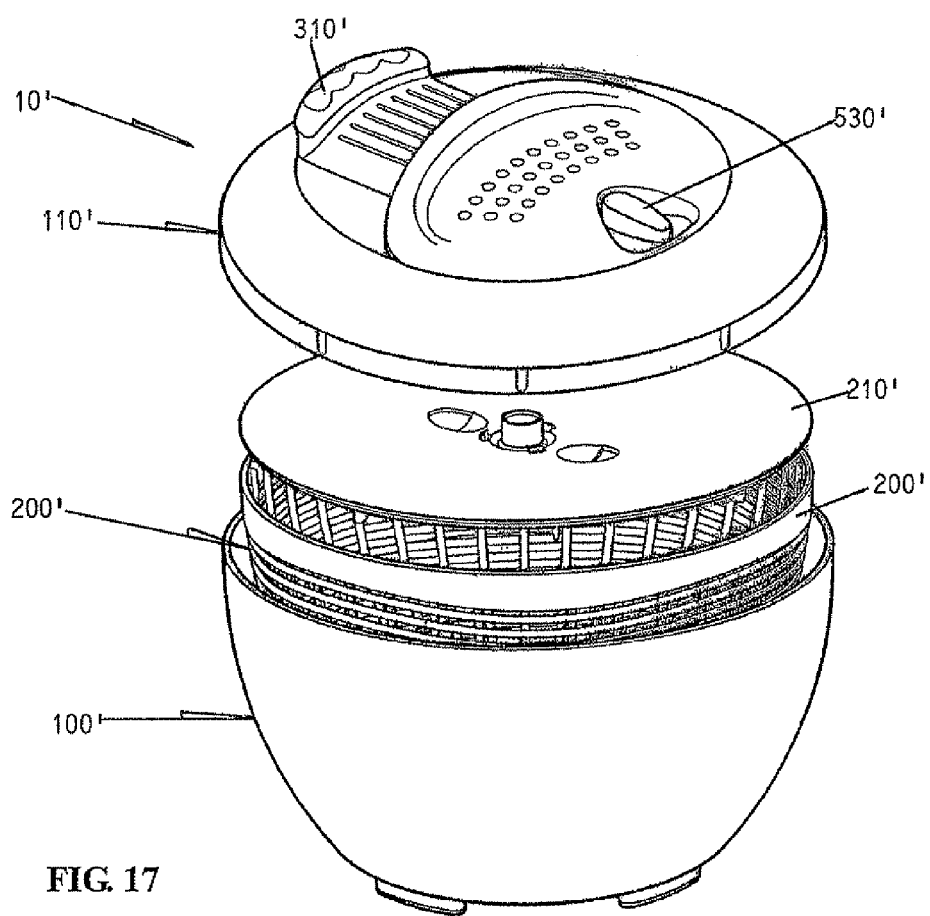
FIG. 17 is a top perspective view corresponding to FIG. 16, showing parts of the salad spinner separated.
Figure 18A:
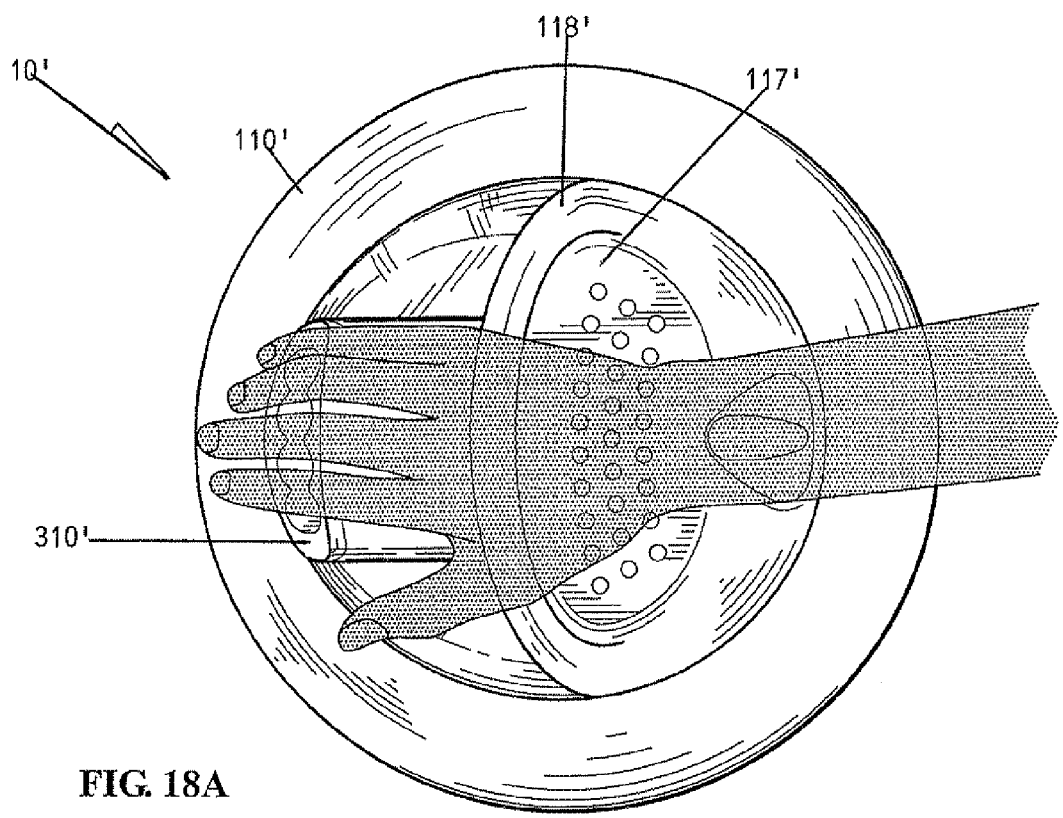
FIGS. 18A and 18B are top plan and perspective views of the salad spinner of FIG. 16, showing it being operated by a hand.
Figure 18B:
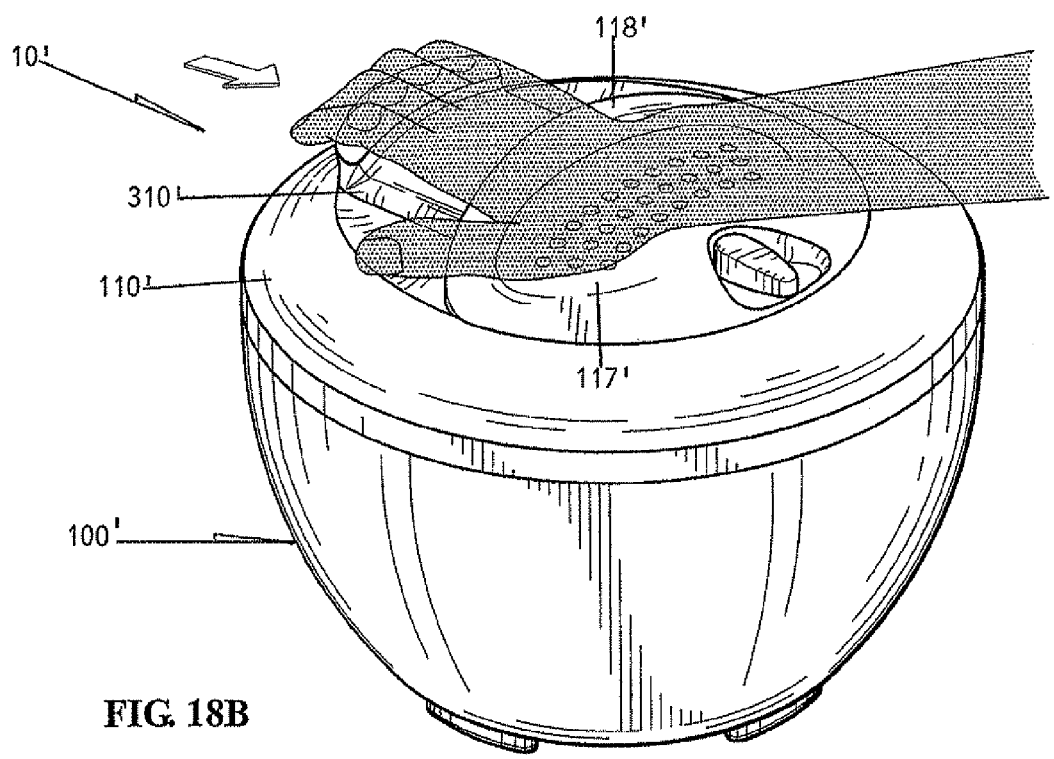
Figure 19:
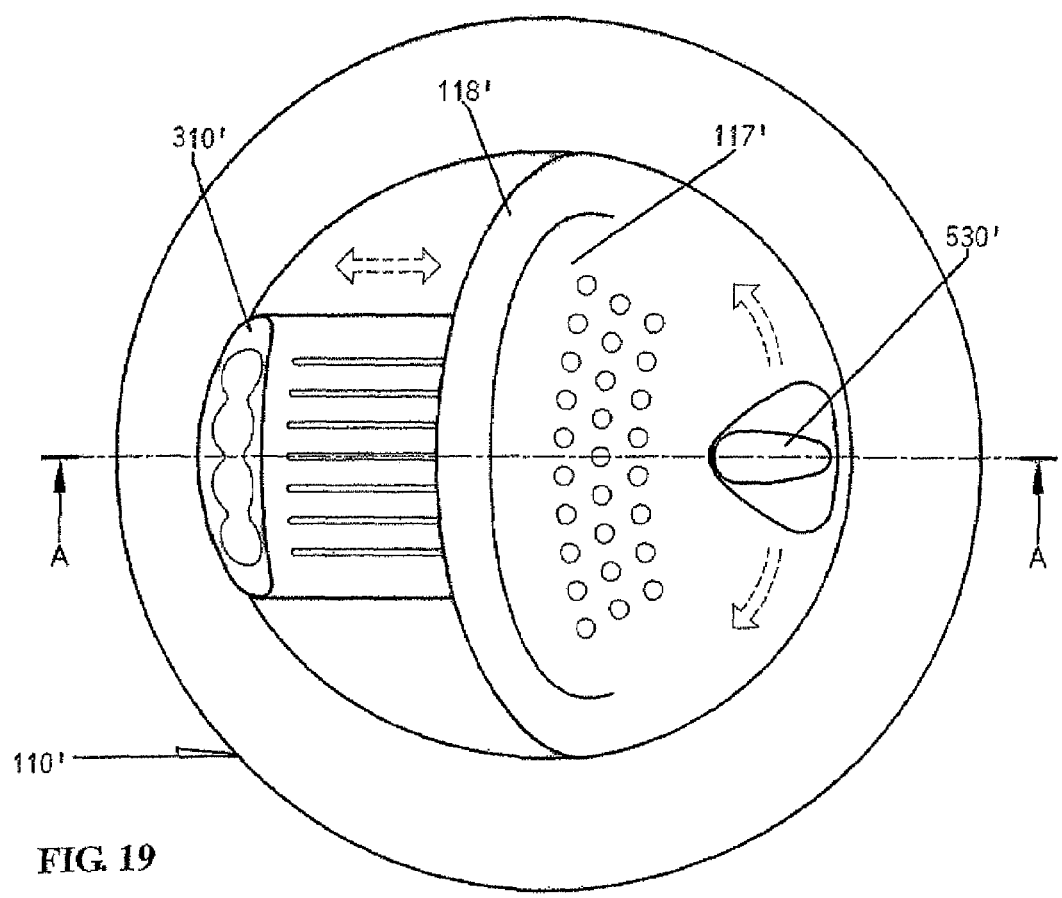
FIG. 19 is a top plan view of the salad spinner of FIG. 16.
Figure 20:
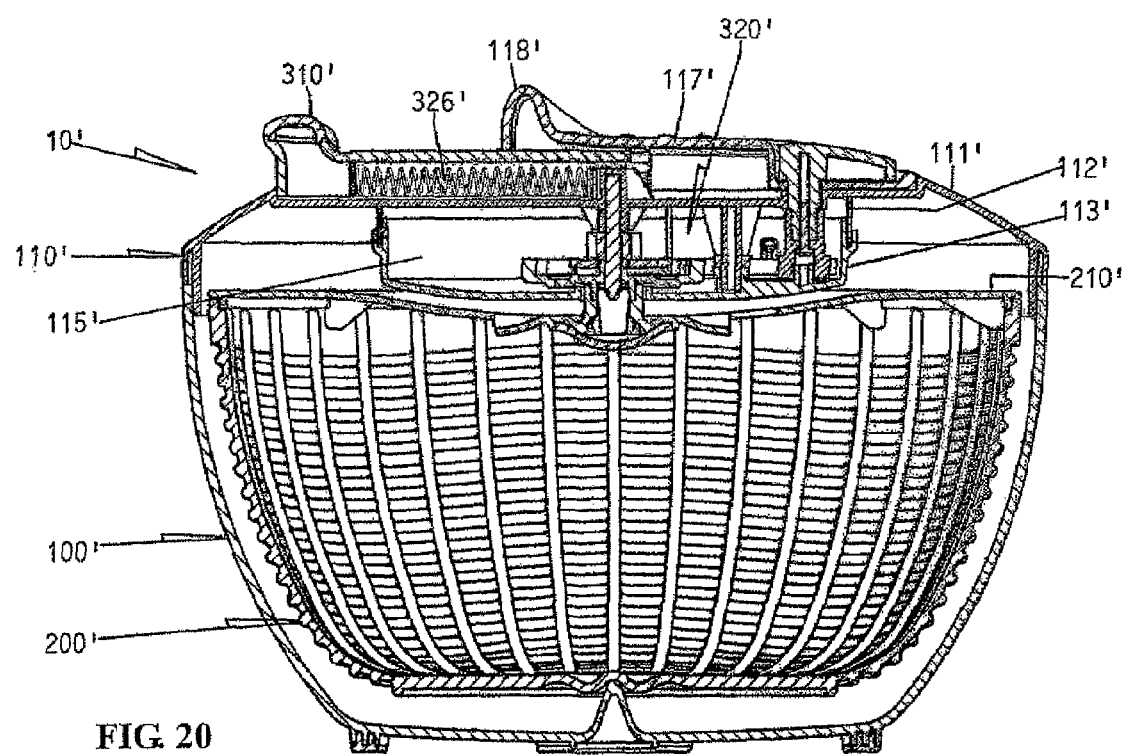
FIG. 20 is a cross-sectional side view of the salad spinner of FIG. 19, taken along line XX-XX.
Figure 21:
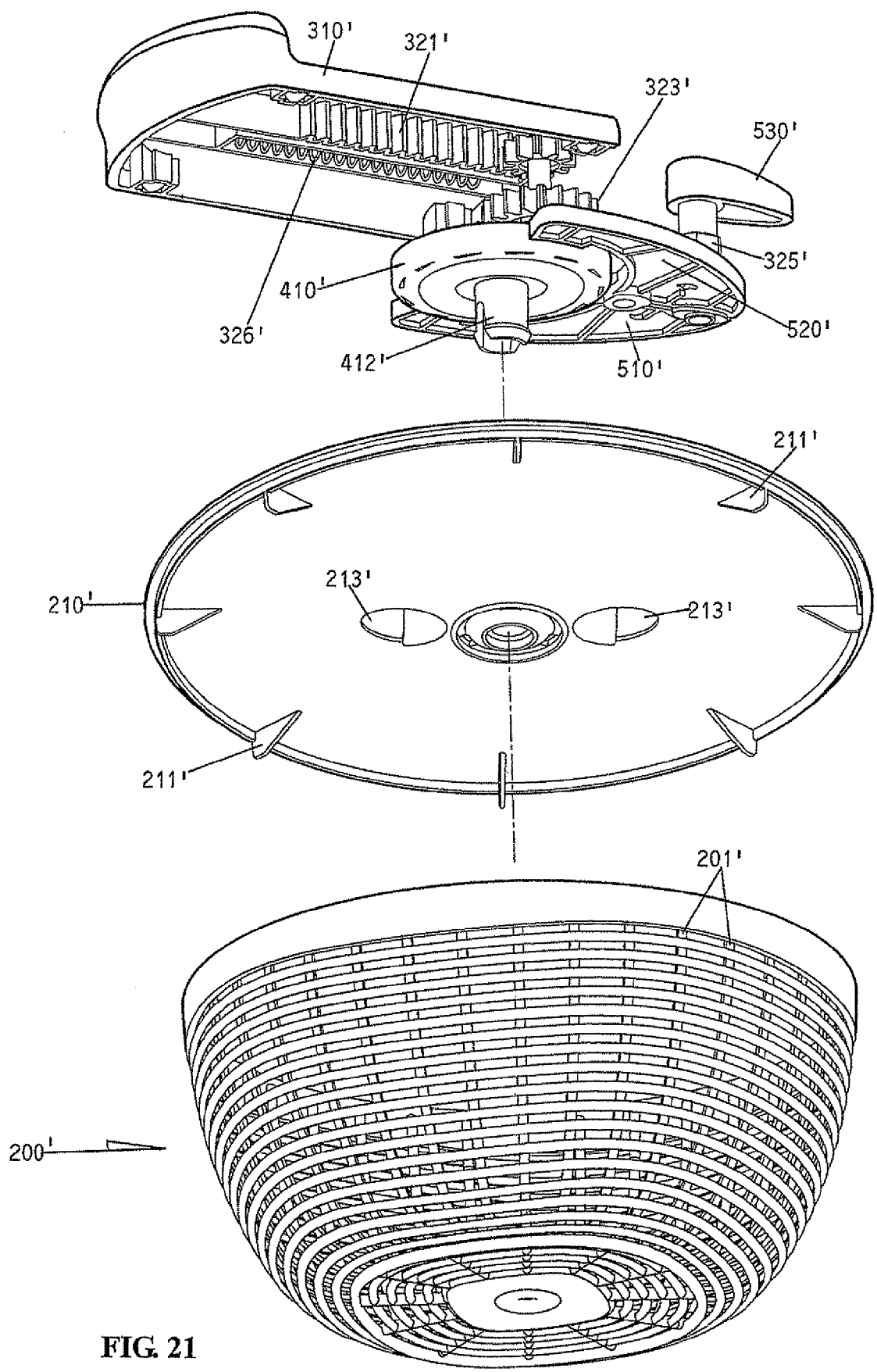
FIG. 21 is a partially exploded bottom perspective view of the salad spinner of FIG. 16.
Figure 22:
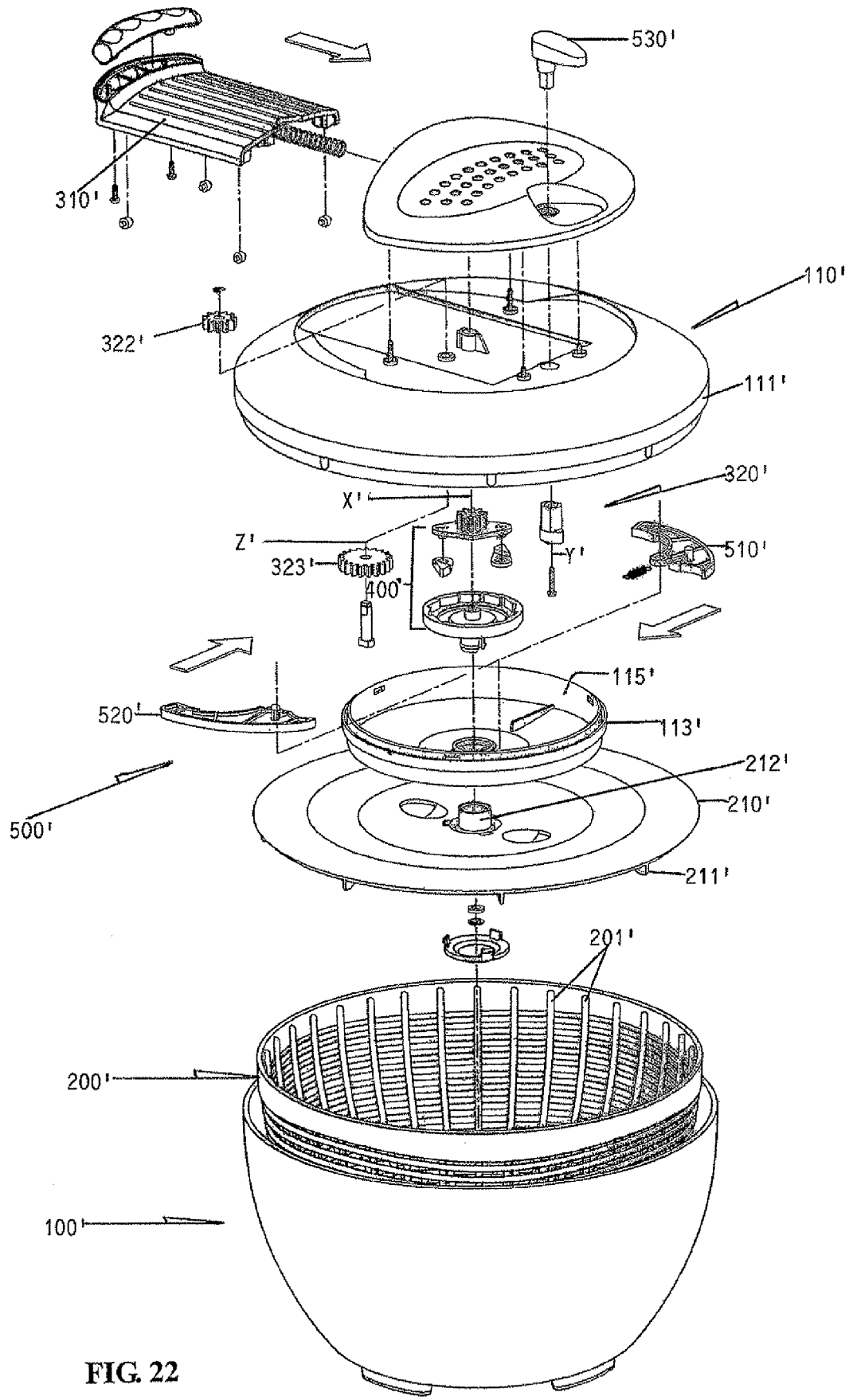
FIG. 22 is an exploded top perspective view of the salad spinner of FIG. 16.
Figure 23A:
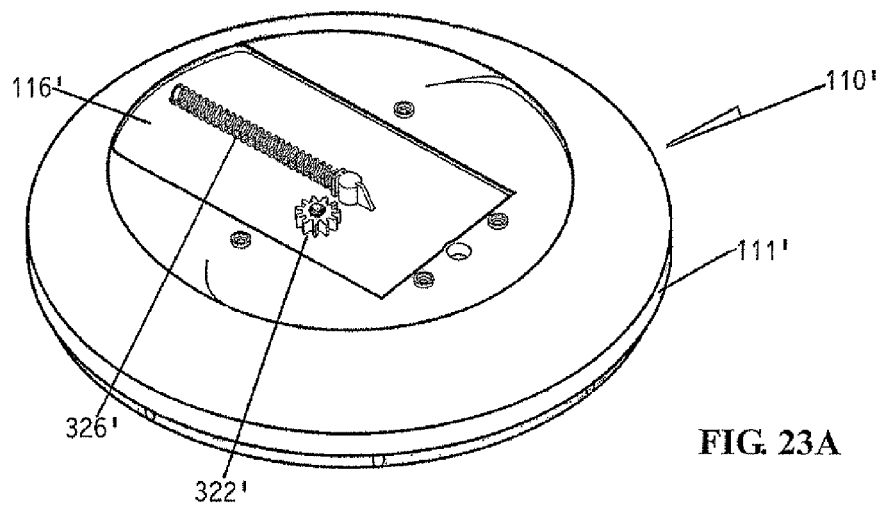
FIGS. 23A, 23B and 23C are top perspective views of a drive mechanism of the salad spinner of FIG. 16.
Figure 23B:
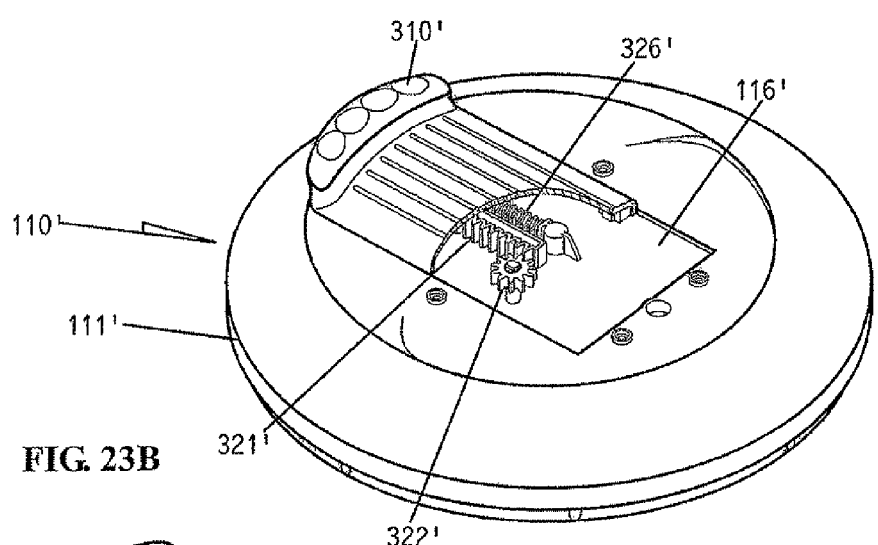
Figure 23C:
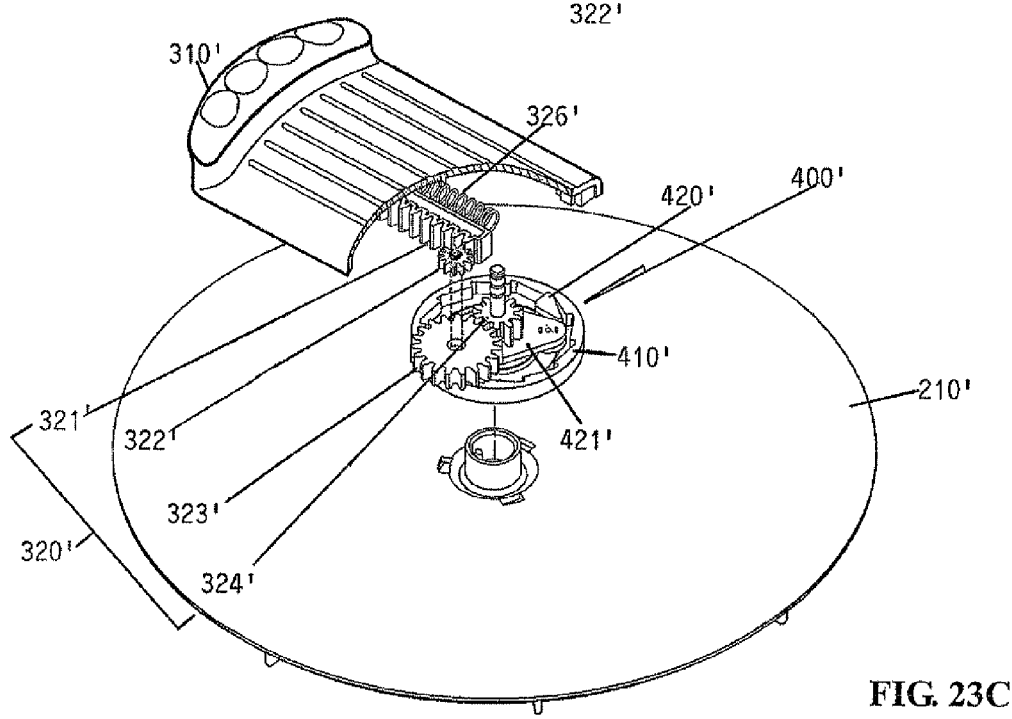

The shoes 510 and 520 are hinged at mid-length about respective hinges 519 and 529 for limited pivotal movement, with their first ends 511 and 521 close to each other and their second ends 512 and 522 flanking the ratchet disc 410. The shoes 510 and 520 are resiliently biased outwardly by separate coil springs 513 and 523 such that their second ends 512 and 522 are spaced narrowly apart from the periphery of the ratchet disc 410 (FIG. 14). In this inoperative position, the shoes' first ends 511 and 521 abut with each other and with respective lobes 325A and 325B of the cam 325.

As the lever 310 is pushed anti-clockwise from its rest position R to a hindmost position H, the cam 325 pivots the shoes 510 and 520 apart by their first ends 511 and 521 counteracting the springs 513 and 523, thereby pressing their second ends 512 and 522 against the periphery of the ratchet disc 410 to brake the disc 410 by friction (FIG. 15) and hence the basket 200.

It is noted that the lever 310 is a unitary device which is designed to perform two functions, i.e. to operate the drive mechanism 300 upon being pulled repeatedly to spin the basket 200 fast and to subsequently apply the braking mechanism 500 upon being pushed to stop the basket 200 quick.

Reference is now made to FIGS. 16 to 26B, which show a second food processing device also in the form of a salad spinner 10' embodying the invention, which has generally the same basic construction and operates in a similar manner as the first salad spinner 10 except as described below, with equivalent parts designated by the same reference numerals suffixed by an apostrophe sign. The major difference lies in the construction and operation of the drive mechanism 300' and the braking mechanism 500'.

In this embodiment, the drive mechanism 300' comprises a manually operable actuator in the form of a horizontal slider 310' and a gear train 320' provided between the slider 310' and the basket 200' via the ratchet assembly 400' as part of the mechanism 300'.

The upper surface of the body 111' of the bowl lid 110' is configured to provide a level linear track 116' for the slider 310' and a roof 117' which encloses an inner end of the track 116' to form a dock for receiving the slider 310'. The roof 117' has an uppermost ridge 118' extending alongside the entrance of the dock.

The slider 310' lies on, or very close to, the track 116' and is slidable horizontally therealong in opposite directions between an outer rest position out of the roof 117' and an inner position into the roof 117'. An internal coil spring 326' resiliently biases the slider 310' outwardly towards the rest position.

The gear train 320' acts as a speed increaser, which is formed by a series of four gears 321' to 324' supported for rotation about two vertical axes, with the exception of the leading gear 321' which is a straight rack. The rack 321' is an internal integral part of the slider 310', which extends parallel to the track 116' and is in mesh with the second gear 322'. The third gear 323' is rotatable with the second gear 322' about the same axis, and in mesh with the trailing gear 324'. As in the case of the earlier embodiment, the trailing gear 324' is integrally co-axially formed with the crossbar 421' of the ratchet assembly 400', and the assembly 400' has the same construction and operates in the same manner as described above.

In operation, the slider 310' is held by one hand, say the right hand, of a user (FIGS. 18A and 18B), with the fingers gripping a raised free end of the slider 310' and the back of the palm abutting and bearing right behind the ridge 118' for support to draw the slider 310' into the roof 117'. Upon release, the slider 310' will immediately self-return to the outer rest position under the action of the spring 326'.

The ridge 118' is located within the periphery of the lid surface and, more specifically, somewhat in the middle of the lid surface as shown, such that the user's hand can rest entirely on the lid surface for stably holding the salad spinner 10' in position. One hand operation is facilitated by the design of the slider 310' and the lid 110'.

Figure 24A:
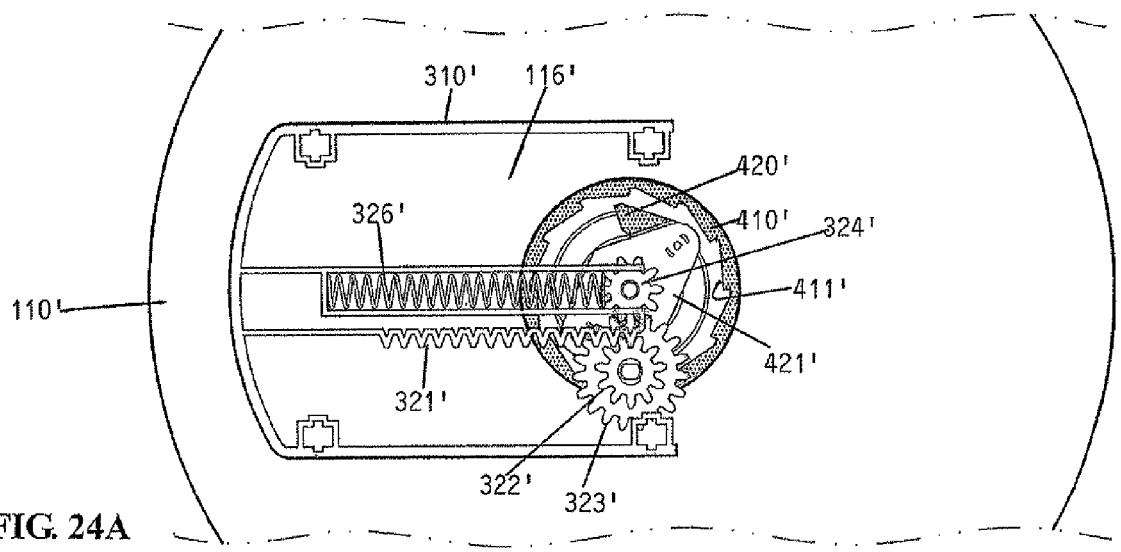
FIGS. 24A, 24B and 24C are internal top views showing the operation of the drive mechanism of FIGS. 23A, 23B and 23C.
Figure 24B:
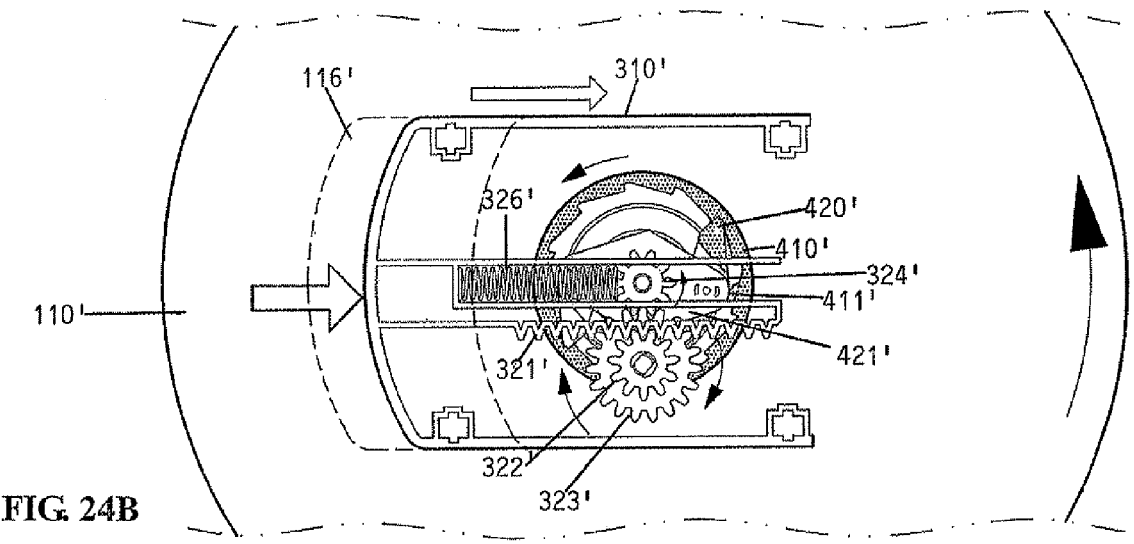
Figure 24C:
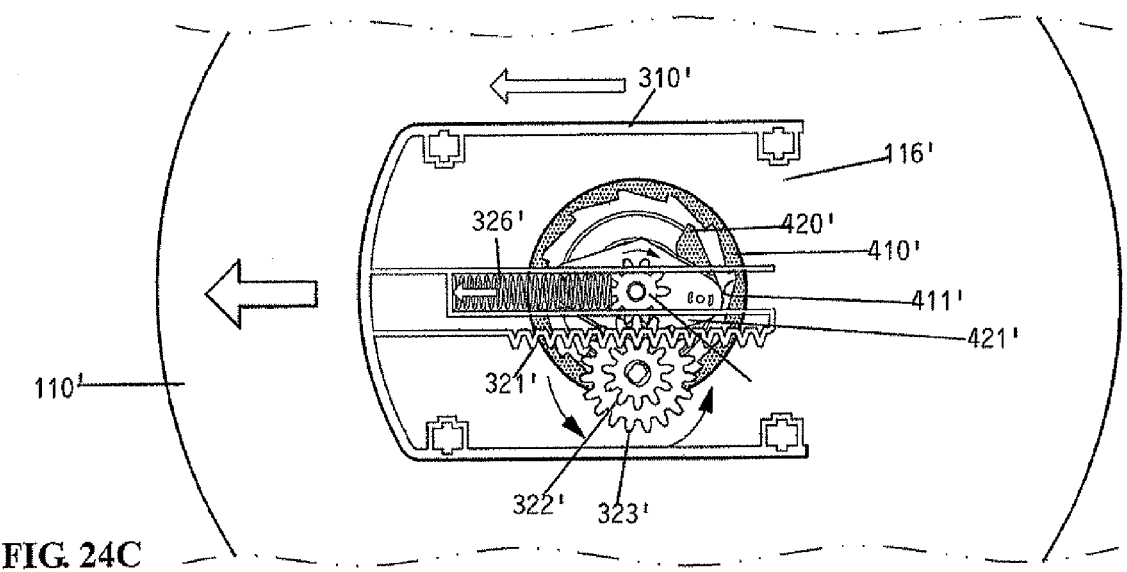

The slider 310' is pulled and released repeatedly to slide its rack 321' back-and-forth and hence to turn the other gears 322' to 324' in opposite directions (FIGS. 24B and 24C). Such bi-directional rotational drive is speeded up and transmitted by the gear train 320' via the trailing gear 324' to the pawls 420' of the ratchet assembly 400'.

As the slider 310' is pulled back, the pawls 420' are turned anti-clockwise to thereby engage with or catch the ratchet teeth 411' and hence rotate the ratchet disc 410' anti-clockwise (FIG. 24B). Via the coupling between the disc 410' and the lid 210', the rotation is thus imparted to the basket 200', which then rotates in the same anti-clockwise direction.

As the slider 310' is subsequently released to re-extend outwards, the pawls 420' are turned clockwise and thus disengage from the teeth 411' and hence skip or release the ratchet disc 410', which is then allowed to continue to rotate anti-clockwise (FIG. 24C) with the basket 200' and lid 210' under the action of momentum. Continual rotation of the basket 200', etc. is practically unhindered.

By reason of such catch and release actions, the ratchet assembly 400' transmits drive from the gear train 320' to the basket 200' in one single direction (i.e. anti-clockwise) only upon sliding of the slider 310' from its outer position to its inner position. Such transmission repeats for as long as the slider 310' is being pulled. Although the rotational drive is transmitted and applied to the basket 200' only intermittently, each time the drive is applied the basket 200' gains speed and accelerates, and the basket 200' rotates freely through successive drives. The basket 200' may reach a maximum speed of almost 800 rpm after say five to six strokes if the slider 310 is pulled rapidly and frequently enough.

Figure 25A:
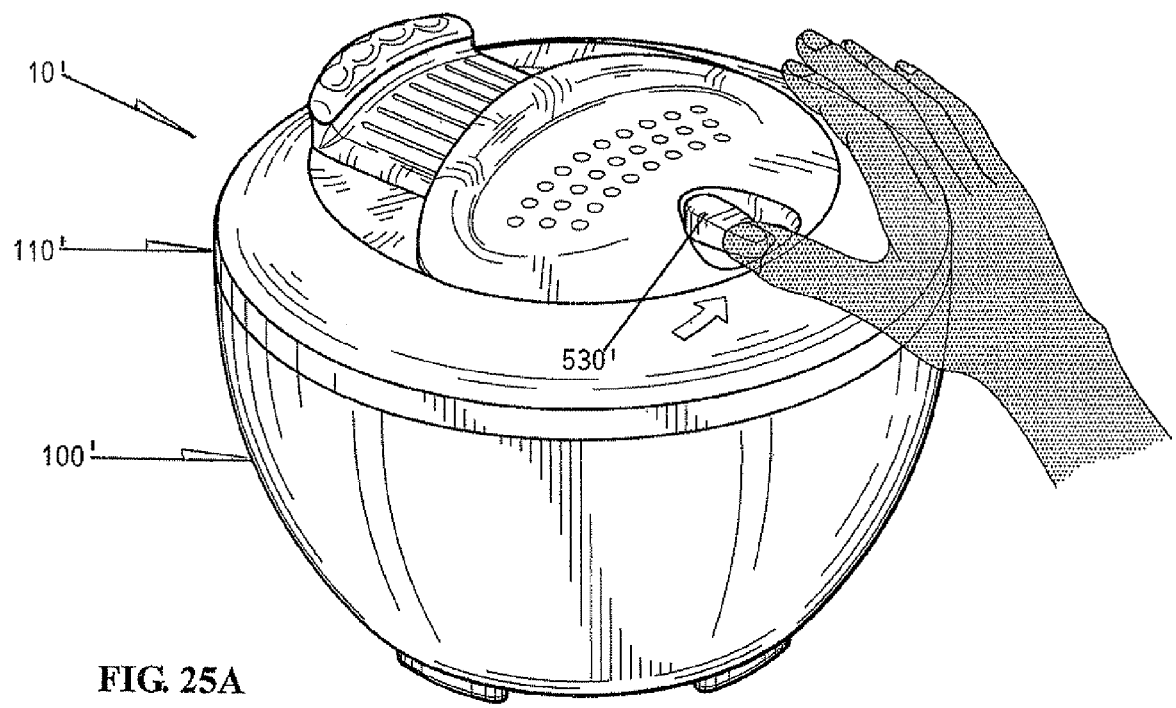
FIGS. 25A and 25B are top perspective views of the salad spinner of FIG. 16, showing a hand operating a braking mechanism thereof.
Figure 25B:
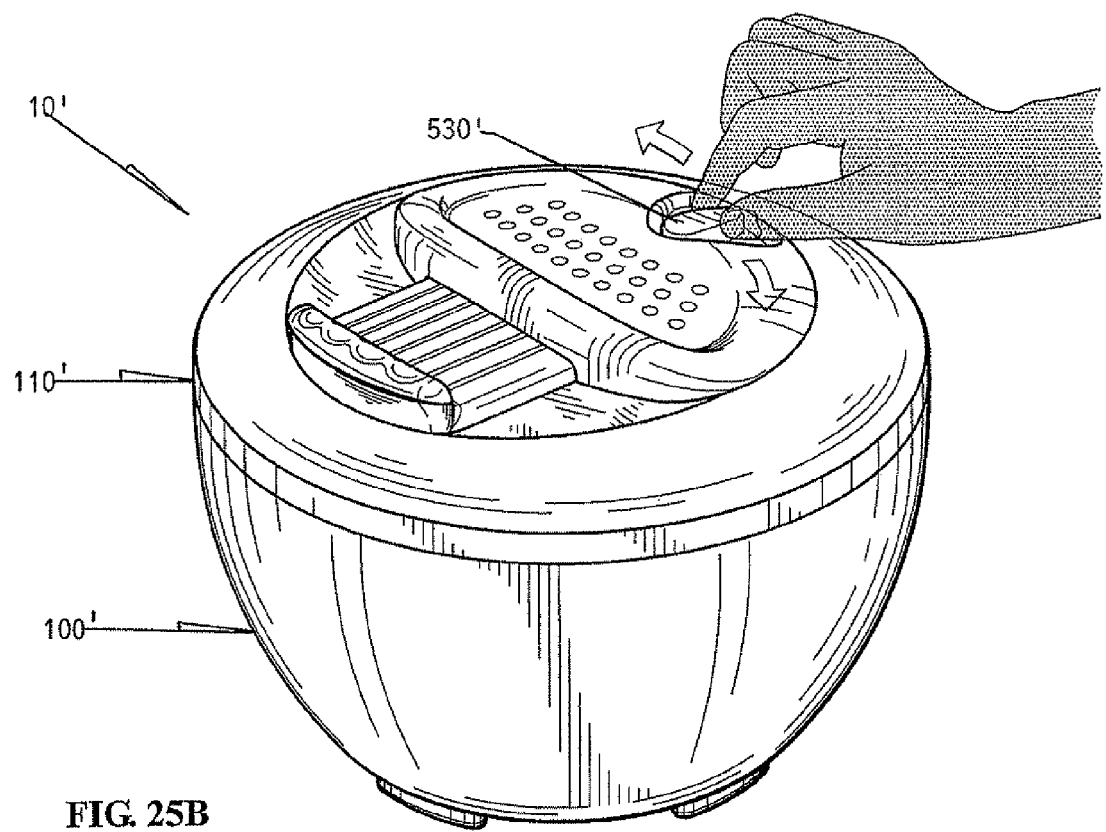
Figure 27:
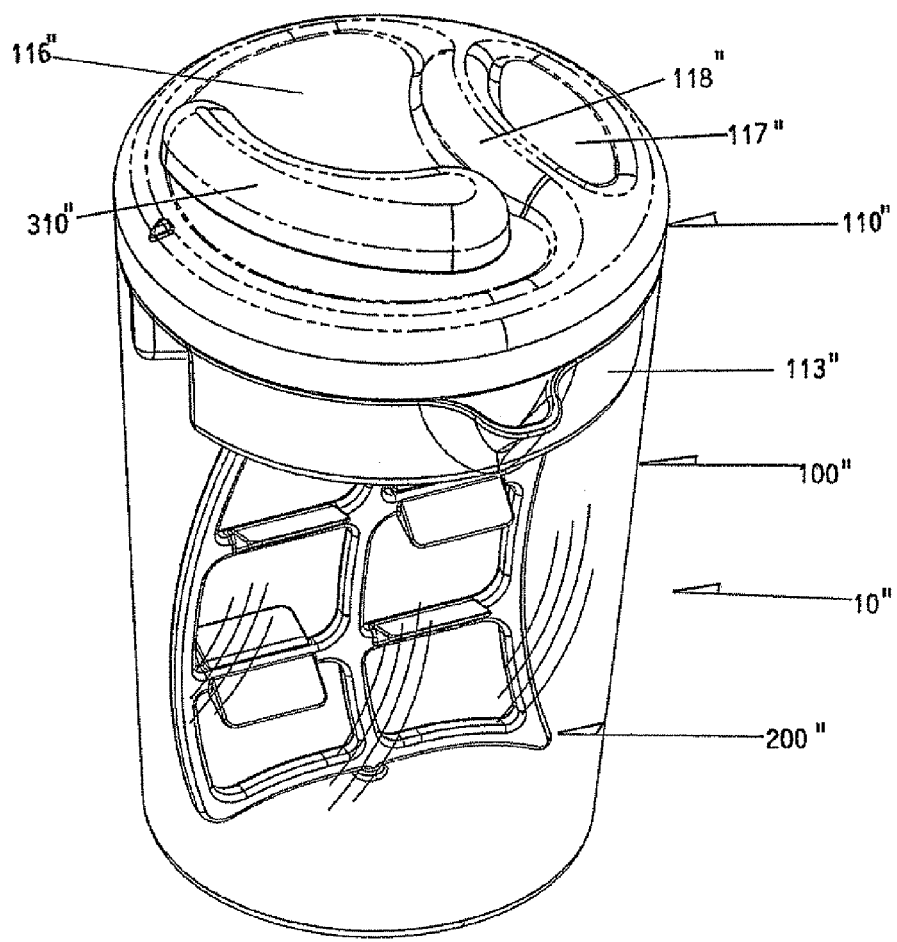
FIG. 27 is a side perspective view of a third embodiment of a food processing device, in the form of a salad dressing mixer, in accordance with the invention.
Figure 28:
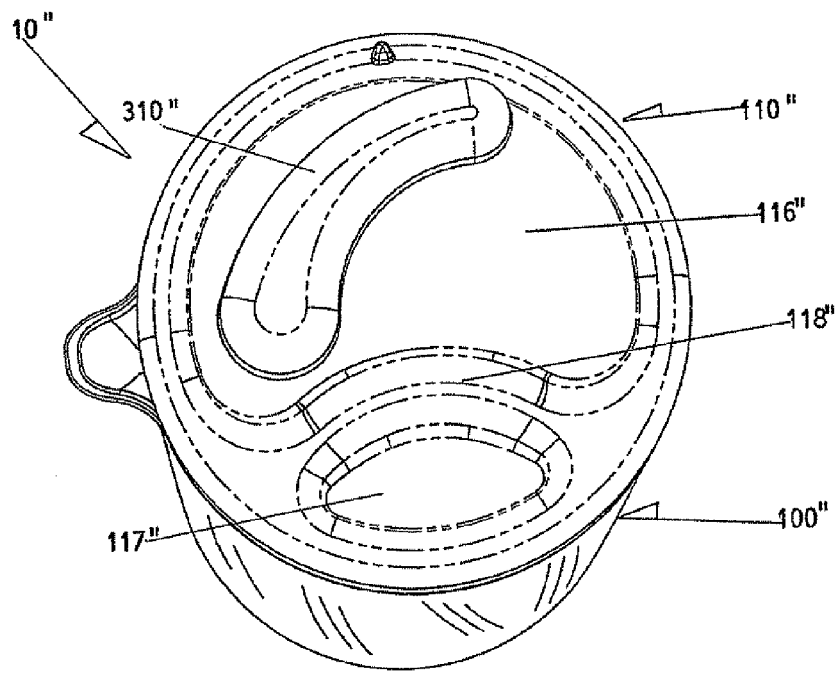
FIG. 28 is a top perspective view corresponding to FIG. 27.
Figure 29:
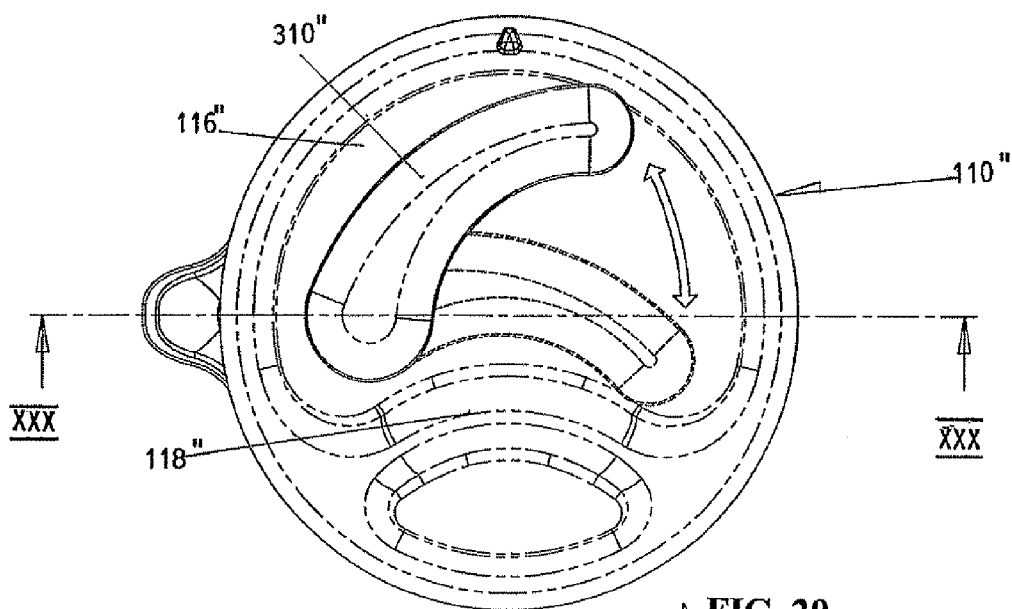
FIG. 29 is a top plan view of the dressing mixer of FIG. 28.
Figure 30:
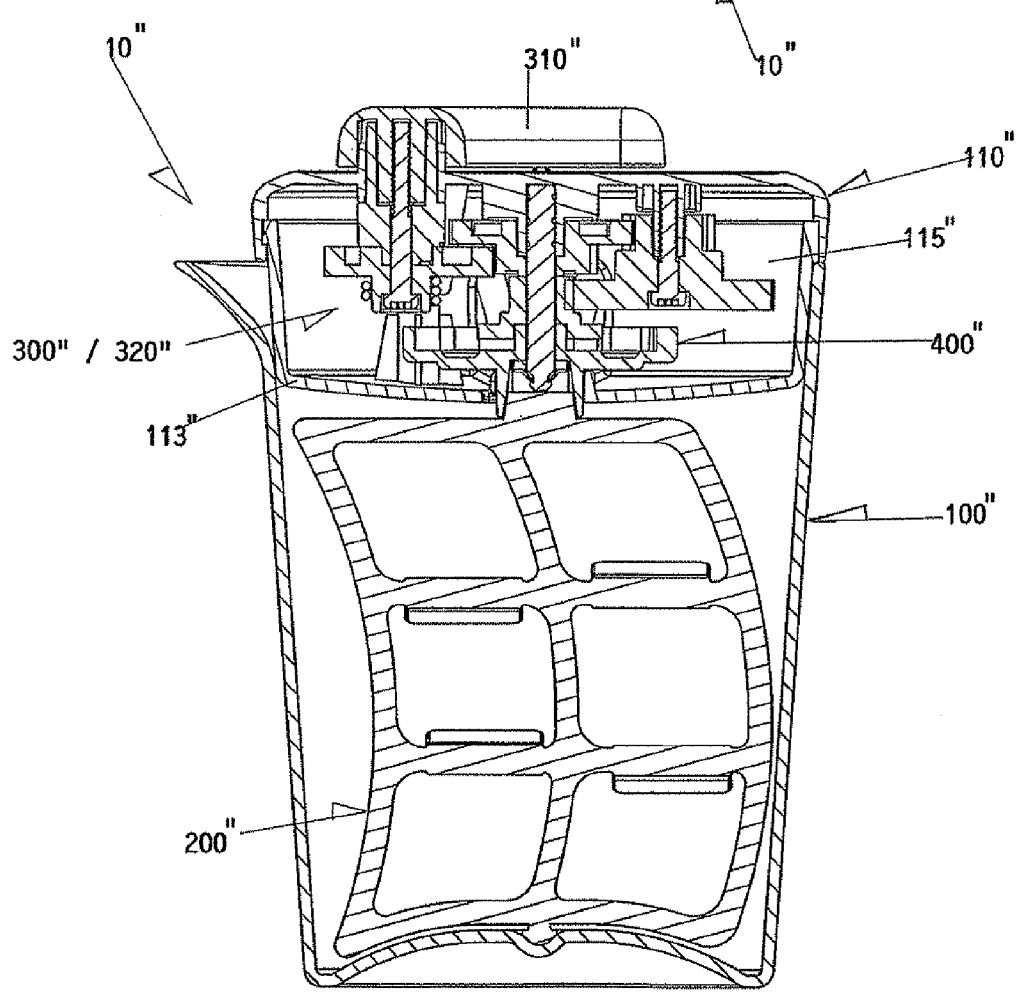
FIG. 30 is a cross-sectional side view of the dressing mixer of FIG. 29, taken along line XXX-XXX.
Figure 31:
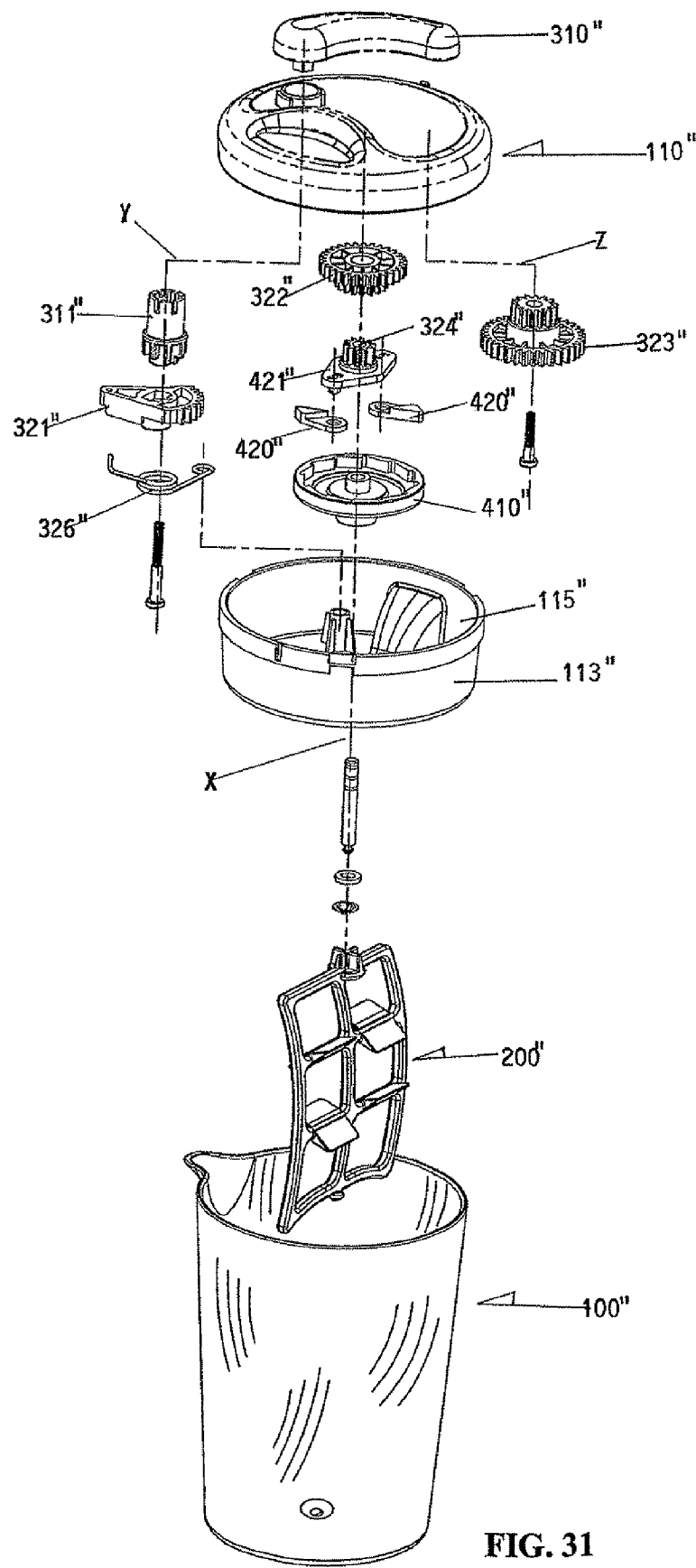
FIG. 31 is an exploded top perspective view of the dressing mixer of FIG. 27.

The braking mechanism 500' has a slightly different construction and is operated by means of an independent operator in the form of a short lever 530' lying on the bowl lid 110'. The lever 530' is pivotable about a vertical shaft inside the cavity 115' of the bowl lid 110', to which a rotary cam 325' is attached. Inside the cavity 115', the braking mechanism 500' includes a pair of flat horizontal and crooked braking shoes 510' and 520' arranged for pivotal movement by the lever 530' via the rotary cam 325' upon pivoting of the lever 530' in either direction (FIGS. 25A and 25B).

The shoes 510' and 520' are hinged at mid-length about a common hinge 519'/529' for limited pivotal movement, with their first ends 511' and 521' flanking the cam 325' and their second ends 512' and 522' flanking the ratchet disc 410'. The first ends 511' and 521' are resiliently biased by a coil spring 513' stretched across them against the cam 325' such that the second ends 512' and 522' are spaced narrowly apart from the periphery of the disc 410' (FIG. 26A).

As the lever 530' is pivoted in either direction, the cam 325' operatively pivots the shoes 510' and 520' apart by their first ends 511' and 521' counteracting the spring 513', whereby their second ends 512' and 522' are pressed against the periphery of the ratchet disc 410' to brake the disc 410' by friction (FIG. 26B) and hence the basket 200'.

Reference is finally made to FIGS. 27 to 36B, which show a third food processing device in the form of a salad dressing mixer 10" embodying the invention, which has generally the same basic construction and operates in a similar manner as the first salad spinner 10 except as described below, with equivalent parts designated by the same reference numerals suffixed by a double quote sign. The major differences lie in the function, i.e. for mixing salad dressing rather than spinning dry salad, and the absence of a braking mechanism (500).

In this embodiment, the housing is an upright cylindrical jar 100" having a beak and a top lid 110", and the lid 110" is closed and engaged from below by an inverted circular base cap 113" having a matching diameter. The base cap 113" defines an internal cavity 115" with and underneath the lid 110, within which a drive mechanism 300" with ratchet assembly 400" is installed.

For mixing salad dressing or the like, a flat latticed mixer blade 200" is employed as the operating attachment or agitator, which has an uppermost central stem 212" for connection to the ratchet assembly 400" for rotation by the drive mechanism 300". To this end, the ratchet assembly 400" has a rotary disc 410" that in turn has a depending central tubular socket 412" into which the stem 212" is plugged. A lowermost central knob of the blade 200" sits in a central bearing recess in the bottom of the jar 100" for support.

Like the first drive mechanism 300, the present drive mechanism 300" comprises a hinged actuating lever 310" lying horizontally flat on a depressed level region 116" of the upper surface of the lid 110", and a speed increasing gear train 320" arranged in the lid cavity 115" for turning in opposite directions by the lever 310" upon the lever 310" being pivoted repeatedly back and forth.

The gear train 320" is formed by a series of four gears 321" to 324" supported for rotation about vertical axes Y, X, Z and X respectively. The leading gear 321" is driven by the lever 310" by means of a square drive 311" which is coupled with the pivoted end of the lever 310" and about which the lever 310 pivots about axis Y in reciprocation. The trailing gear 324" is integral co-axially upon a horizontal crossbar 421", with pawls 420" hinged at opposite ends, of the ratchet assembly 400".

Figure 32:
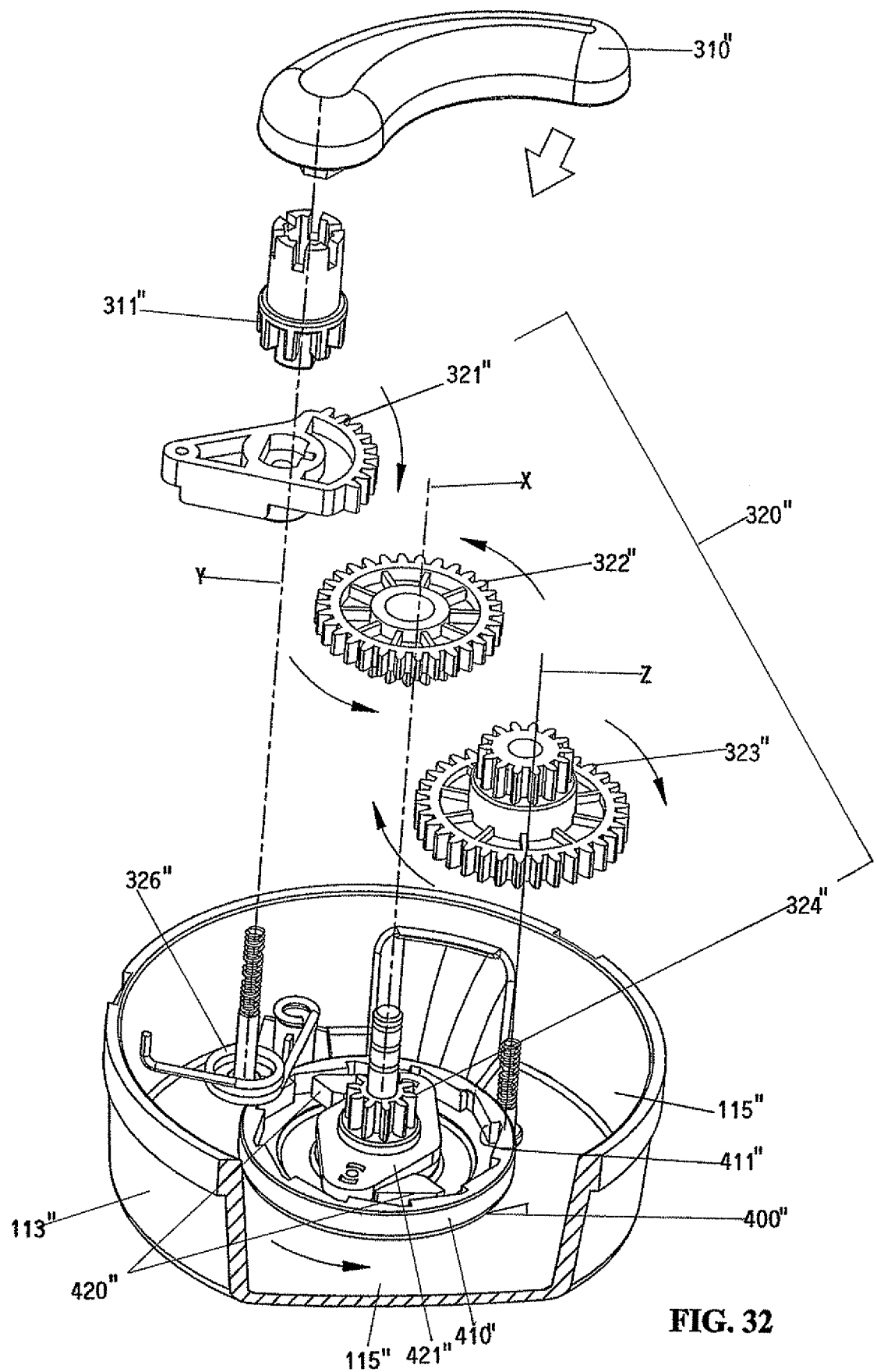
FIG. 32 is an exploded top perspective view of a drive mechanism of the dressing mixer of FIG. 27.

A nearby elbow spring 326" resiliently biases the leading gear 321" to turn anti-clockwise, and hence the overall gear train 320", the ratchet crossbar 421" and the lever 310" simultaneously in the relevant directions. The lever 310" normally rests in an outer position and is in use pivoted inwards, i.e. clockwise as shown in FIG. 32, to turn the gears 321" to 324" as indicated by arrows and then the crossbar 421" anti-clockwise. Upon release, the lever 310" self pivots back under the action of the spring 326", whereby the gear train 320" and the ratchet crossbar 421" reverse.

Figure 33:
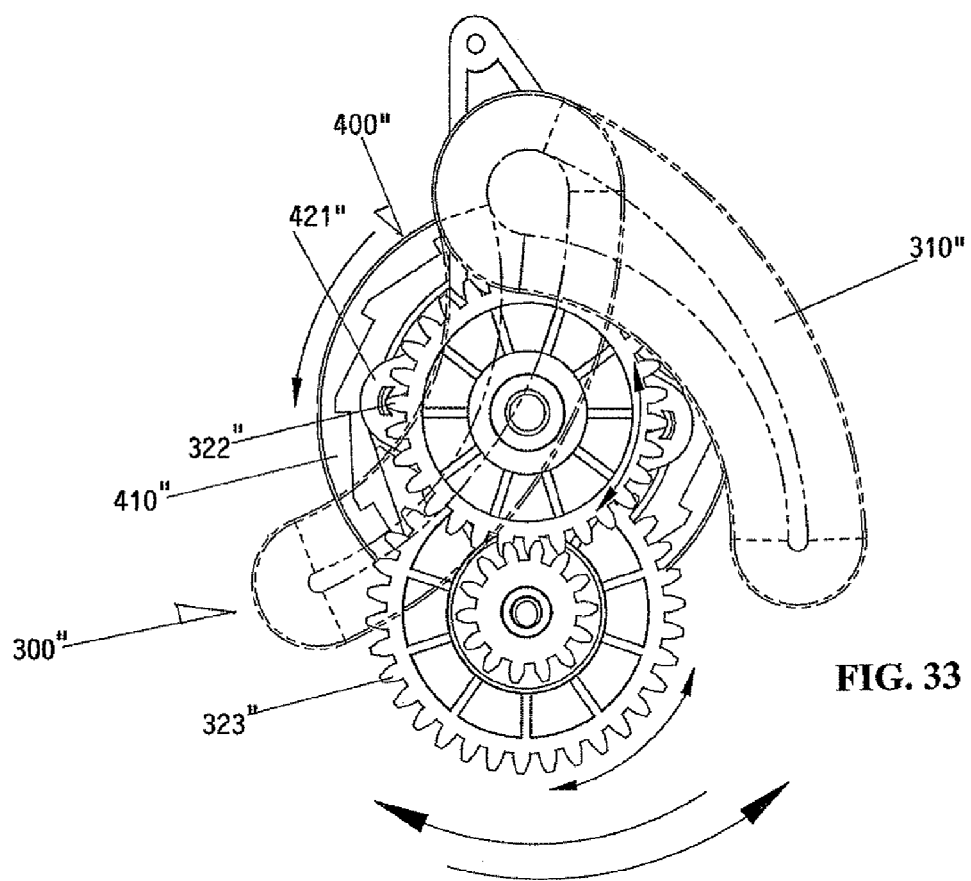
FIG. 33 is a top plan view of the drive mechanism of FIG. 32.
Figure 33A:
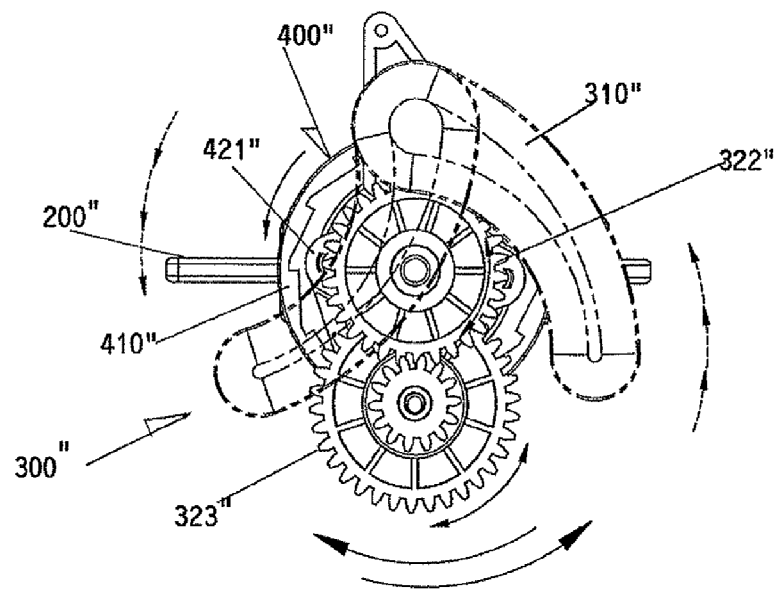
FIG. 33A is a top plan view similar to FIG. 33, showing also a mixer blade driven by the drive mechanism.
Figure 34:
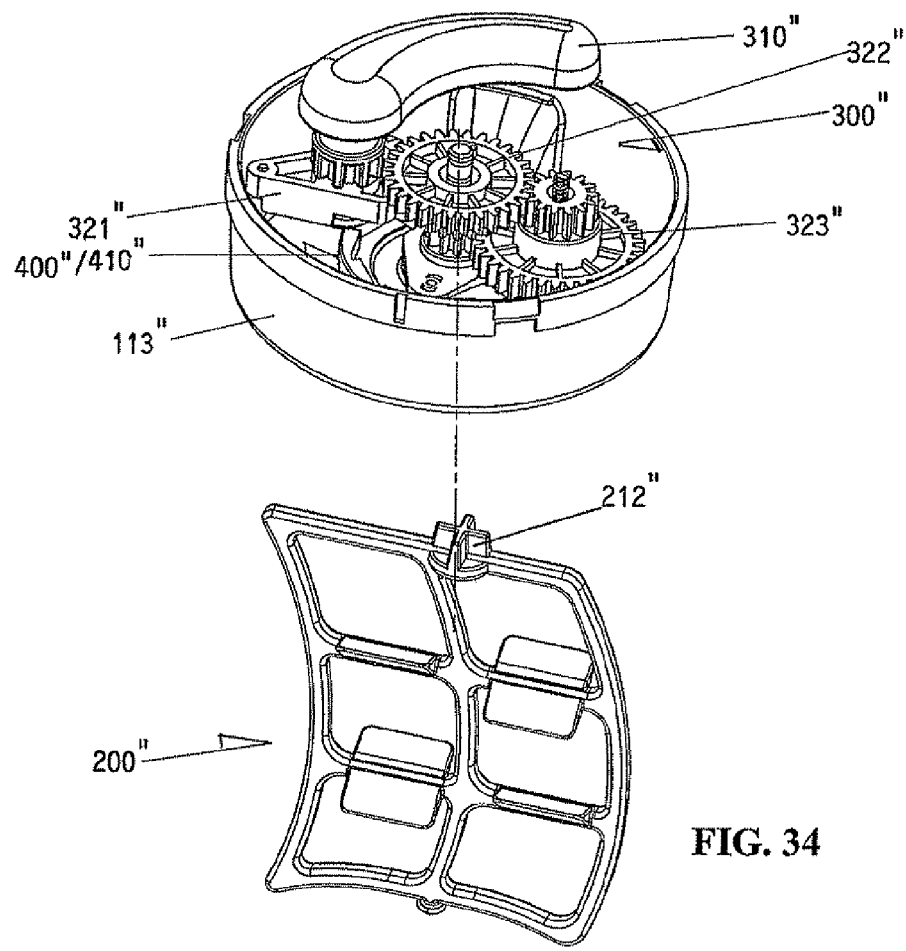
FIG. 34 is a top perspective view of the drive mechanism and mixer blade, separated, of FIG. 33A.
Figure 34A:
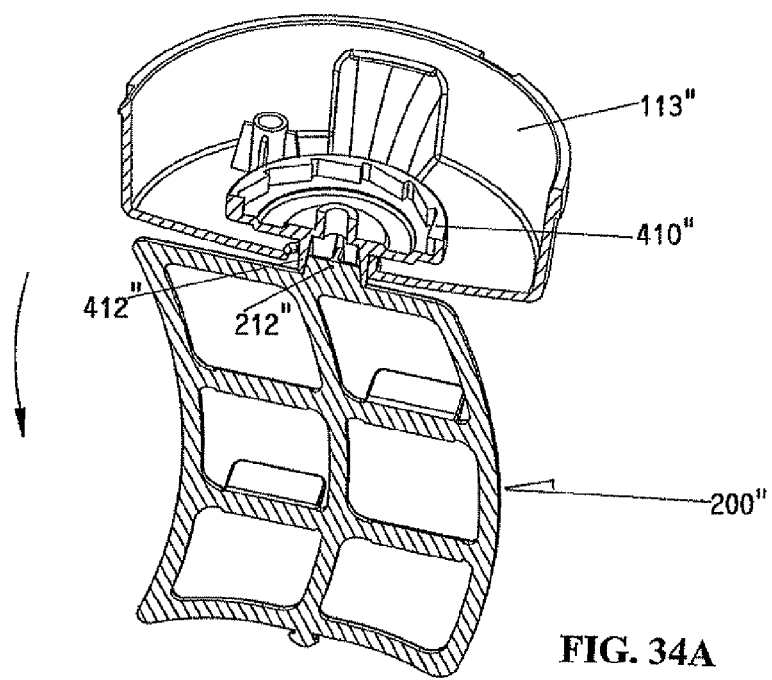
FIG. 34A is a top perspective view similar to FIG. 34, showing the mixer blade attached to the drive mechanism.

The ratchet assembly 400" has the same construction and operates in the same manner as the first ratchet assembly 400 described above. Through repeated catch and release actions between the hinged pawls 420" and the skew teeth 411", the ratchet assembly 400" transmits drive from the gear train 320" to the blade 200" in one single direction (i.e. anticlockwise as shown in FIG. 33A) only upon inward pivoting of the lever 310". Such transmission repeats for as long as the lever 310" is being operated, whereby the blade 200" is turned at an appropriate speed to whip salad dressing or cream (for making whipped cream) contained in the jar 100".

Agitators other than the latticed blade 200" may be attached and used instead, such as wire whips or dough hooks, depending on the nature of the food and the intended action thereon. Because mixing/beating actions do not normally require a very high speed (as salad spinners), and the agitator will rapidly slow down and stop in dressing/cream or dough in particular, no braking mechanism (500) is installed.

By reason of the arrangement of the lever 310" lying on or close to the lid 110", and the upper surface profile of the lid 110", and in particular presence of the ridge 118" that provides support for the thumb of a user, one hand operation is made possible or facilitated.

For further details about the construction, components and operation of the dressing mixer 10" not explicitly described herein, the relevant disclosure in relation to the first salad spinner 10 described above is incorporated by reference.

It is envisaged that any other suitable forms of drive transmission system (320/320'/320") may be employed or included, such as pulleys and belts.

The invention has been given by way of example only, and various other modifications of and/or alterations to the described embodiments may be made by persons skilled in the art without departing from the scope of the invention as specified in the appended claims.

The invention claimed is:

1. A food processing device comprising:
   a housing having a lid;
   an attachment supported in the housing for rotation about an axis of rotation; and
   a drive mechanism supported by the lid for rotating the attachment to process food in the housing, wherein the drive mechanism comprises
   a manually operable actuator,
   a drive transmission system coupling the actuator to the attachment to transmit a driving force applied to the actuator to rotate the attachment, the actuator lying on an outer surface of the lid and being movable along the outer surface of the lid in opposite directions, between first and second positions, to rotate the attachment in a single direction of rotation, wherein the lid includes an abutment raised from the outer surface of the lid and located so that the actuator is closer to the abutment in the second position of the actuator than in the first position of the actuator, the abutment thereby providing a support facilitating one-handed operation of the actuator; and
   a first spring resiliently biasing the actuator towards the first position and returning the actuator to the first position upon release of the actuator.

2. The food processing device as claimed in claim 1, wherein the outer surface of the lid extends transversely of the axis of rotation.

3. The food processing device as claimed in claim 2, wherein the outer surface of the lid extends at substantially right angles to the axis of rotation.

4. The food processing device as claimed in claim 1, wherein the abutment is located within a periphery of the outer surface of the lid.

5. The food processing device as claimed in claim 1, wherein the actuator is supported for pivotal movement in opposite directions between the first and second positions.

6. The food processing device as claimed in claim 5, wherein the actuator is elongate and is pivotable about a first end of the actuator, the first end being in driving engagement with the drive transmission system.

7. The food processing device as claimed in claim 1, wherein the actuator is supported for linear movement in opposite directions between the first and second positions.

8. The food processing device as claimed in claim 7, wherein the actuator includes a rack in driving engagement with the drive transmission system.

9. The food processing device as claimed in claim 1, wherein the drive transmission system comprises a train of gears.

10. The food processing device as claimed in claim 1, wherein the attachment comprises a basket having a lid engageable by the drive mechanism for rotation to spin water from food in the basket.

11. The food processing device as claimed in claim 1, wherein the attachment comprises an agitator engageable by the drive mechanism for rotation to agitate food in the housing.

12. The food processing device as claimed in claim 1, wherein the drive mechanism includes a ratchet assembly in driving engagement with the drive transmission system for transmission of rotational drive only in the single direction from the actuator to the attachment upon movement of the actuator from the first position to the second position.

13. The food processing device as claimed in claim 12, wherein the ratchet assembly is provided between the drive transmission system and the attachment.

14. The food processing device as claimed in claim 12, wherein the ratchet assembly comprises a ratchet member and at least one pawl co-operable with the ratchet member, the ratchet member and the at least one pawl being associated with the attachment, and with a trailing end member of the drive transmission system, respectively.

15. The food processing device as claimed in claim 14, wherein the ratchet member has a circular arrangement of skew teeth surrounding the at least one pawl for engagement to transmit a driving force.

16. The food processing device as claimed in claim 15, wherein the at least one pawl is hinged for free pivotal movement.

17. The food processing device as claimed in claim 15, wherein the ratchet assembly includes at least two pawls arranged symmetrically about an axis of rotation of the ratchet member.

18. The food processing device as claimed in claim 17, wherein the ratchet assembly includes a carrier having opposite parts at each of which one of the pawls is hinged.

19. The food processing device as claimed in claim 18, wherein the trailing end member of the drive transmission system includes the carrier.

20. The food processing device as claimed in claim 12, wherein the attachment comprises a basket having a lid engageable by the ratchet assembly for rotation to spin water from food in the basket.

21. The food processing device as claimed in claim 12, wherein the attachment comprises an agitator engageable by the ratchet assembly for rotation to agitate food in the housing.

22. The food processing device as claimed in claim 1, including a braking mechanism for braking rotation of the attachment, the braking mechanism comprising a manual operator and at least one braking member for movement by the manual operator to brake rotation of the attachment.

23. The food processing device as claimed in claim 22, wherein the braking mechanism is housed inside the lid, with the manual operator exposed on the outer surface of the lid.

24. The food processing device as claimed in claim 22, wherein the manual operator lies on the outer surface of the lid and is movable along the outer surface of the lid.

25. The food processing device as claimed in claim 22, including a second spring resiliently biasing the at least one braking member into an inoperative position, the braking member being movable by the operator against the bias of the second spring to an operative position to brake rotation of the attachment.

26. The food processing device as claimed in claim 22, wherein the drive mechanism includes a drive member for coupling with the attachment to rotate the attachment, the at least one braking member being engageable with the drive member to brake rotation of the attachment.

27. The food processing device as claimed in claim 26, wherein the drive mechanism includes a ratchet assembly in driving engagement with the drive transmission system for transmission of rotational drive only in the single direction from the actuator to the attachment upon movement of the actuator from the first position to the second position.

28. The food processing device as claimed in claim 27, wherein the ratchet assembly comprises a ratchet member and at least one pawl co-operable with the ratchet member, the ratchet member and the at least one pawl being associated with the attachment and a trailing end member of the drive transmission system, respectively.

29. The food processing device as claimed in claim 27, wherein the ratchet member has a circular periphery which the at least one braking member engages to brake rotation of the attachment.

30. The food processing device as claimed in claim 29, wherein the braking mechanism includes two braking members disposed on opposite sides of the ratchet member.

31. The food processing device as claimed in claim 26, wherein the attachment comprises a basket having a lid engageable by the drive member for rotation to spin water from food in the basket.

32. The food processing device as claimed in claim 26, wherein the attachment comprises an agitator engageable by the drive member for rotation to agitate food in the housing.

33. A food processing device comprising:
 a housing having a lid;
 an attachment supported in the housing for rotation about an axis of rotation;
 a drive mechanism for rotating the attachment to process food in the housing, wherein the drive mechanism comprises
  a manually operable actuator,
  a drive transmission system coupling the actuator to the attachment to transmit a driving force from the actuator to rotate the attachment, and
  a braking mechanism for braking rotation of the attachment, the braking mechanism comprising a manual operator and at least one braking member for movement by the manual operator to brake rotation of the attachment by friction, wherein
   the drive mechanism includes a drive member for coupling with the attachment to rotate the attachment, and
   the at least one braking member engages the drive member to brake rotation of the attachment; and
  a first spring resiliently biasing the actuator towards the first position and returning the actuator to the first position upon release of the actuator.

34. The food processing device as claimed in claim 33, wherein the braking mechanism is housed inside the lid, with the manual operator exposed on an outer surface of the lid.

35. The food processing device as claimed in claim 33, wherein the manual operator lies on an outer surface of the lid and is movable along the outer surface of the lid.

36. The food processing device as claimed in claim 33, including a second spring resiliently biasing the at least one braking member into an inoperative position, the braking member being movable by the operator against the bias of the spring to an operative position to brake rotation of the attachment.

37. The food processing device as claimed in claim 33, wherein the drive mechanism includes a ratchet assembly in driving engagement with the drive transmission system for transmission of rotational drive in only a single direction from the actuator to the attachment.

38. The food processing device as claimed in claim 37, wherein the ratchet assembly comprises a ratchet member and at least one pawl co-operable with the ratchet member, the ratchet member and the at least one pawl being associated with the attachment and a trailing end member of the drive transmission system, respectively.

39. The food processing device as claimed in claim 38, wherein the ratchet member has a circular periphery upon which the at least one braking member is engageable to brake rotation of the attachment.

40. The food processing device as claimed in claim 39, wherein the braking mechanism includes two braking members disposed on opposite sides of the ratchet member.

41. The food processing device as claimed in claim 33, wherein the actuator and the manual operator are separate devices.

42. The food processing device as claimed in claim 33, wherein the actuator and the manual operator include a unitary device movable in a first direction to rotate the attachment and in a second direction, opposite the first direction, to brake rotation of the attachment.

43. The food processing device as claimed in claim 33, wherein the attachment comprises a basket having a lid engageable by the drive member for rotation to spin water from food in the basket.

44. The food processing device as claimed in claim 33, wherein the attachment comprises an agitator engageable by the drive member for rotation to agitate food in the housing.

45. The food processing device as claimed in claim 22, wherein the actuator and the manual operator are separate devices.

46. The food processing device as claimed in claim 22, wherein the actuator and the manual operator include a unitary device movable in a first direction to rotate the attachment and in a second direction, opposite the first direction, to brake rotation of the attachment.

* * * * *